US012689536B2

(12) United States Patent
Avida et al.

(10) Patent No.: US 12,689,536 B2
(45) Date of Patent: Jul. 21, 2026

(54) SYSTEMS AND/OR METHODS FOR ONLINE CONTENT DELIVERY

(71) Applicant: Engageli, Inc., San Mateo, CA (US)

(72) Inventors: Dan Avida, Portola Valley, CA (US); Serge Plotkin, Los Altos Hills, CA (US); Antony Maria Joseph Peter, Fremont, CA (US); Daphne Koller, Portola Valley, CA (US); Maya Rika Koller Avida, Portola Valley, CA (US)

(73) Assignee: Engageli, Inc., San Mateo, CA (US)

( * ) Notice: Subject to any disclaimer, the term of this patent is extended or adjusted under 35 U.S.C. 154(b) by 151 days.

(21) Appl. No.: 18/477,121

(22) Filed: Sep. 28, 2023

(65) Prior Publication Data

US 2024/0137396 A1 Apr. 25, 2024
US 2024/0236159 A9 Jul. 11, 2024

Related U.S. Application Data

(63) Continuation of application No. 17/368,749, filed on Jul. 6, 2021, now Pat. No. 11,792,239.

(60) Provisional application No. 63/136,596, filed on Jan. 12, 2021, provisional application No. 63/049,087, filed on Jul. 7, 2020.

(51) Int. Cl.
| | |
|---|---|
| *H04L 12/18* | (2006.01) |
| *G06F 3/04842* | (2022.01) |
| *H04L 65/1083* | (2022.01) |
| *H04L 65/401* | (2022.01) |
| *H04L 65/403* | (2022.01) |

(52) U.S. Cl.
CPC ...... *H04L 12/1822* (2013.01); *G06F 3/04842* (2013.01); *H04L 12/1831* (2013.01); *H04L 65/4015* (2013.01); *H04L 65/403* (2013.01); *H04L 65/1083* (2013.01)

(58) Field of Classification Search
CPC ............. H04L 65/1083; H04L 12/1822; H04L 12/1831; H04L 65/4015; G06F 3/04842
See application file for complete search history.

(56) References Cited

U.S. PATENT DOCUMENTS

| | | | | |
|---|---|---|---|---|
| 10,798,341 B1* | 10/2020 | Hegde | ............... | H04N 21/8549 |
| 2007/0019616 A1* | 1/2007 | Rantapuska | .......... | H04L 63/065 |
| | | | | 370/352 |
| 2007/0203980 A1* | 8/2007 | Andersen | ............... | G06Q 10/10 |
| | | | | 709/204 |
| 2013/0265380 A1* | 10/2013 | Wu | ........................ | H04N 7/15 |
| | | | | 348/14.07 |

(Continued)

*Primary Examiner* — Raqiul A Choudhury
(74) *Attorney, Agent, or Firm* — Berkeley Law & Technology Group, LLP

(57) ABSTRACT

Methods, apparatuses, and/or articles of manufacture may be implemented to establish an audio and/or video stream from one or more control/management computing devices utilizing an electronic communications network. The method may further include subdividing, by the instructor computing platform, the plurality of participant computing platforms into one or more virtual groups, in which a first virtual group of the one or more virtual groups acquires the audio and/or video stream and exclusively shares the audio and/or video stream generated by the one or more participants of the first virtual group between or among members of the first virtual group.

17 Claims, 17 Drawing Sheets

(56)                    References Cited

U.S. PATENT DOCUMENTS

| | | | |
|---|---|---|---|
| 2014/0313282 A1* | 10/2014 | Ma | H04N 7/141 |
| | | | 348/14.09 |
| 2016/0119315 A1* | 4/2016 | Uzelac | H04L 65/4038 |
| | | | 709/204 |
| 2018/0375676 A1* | 12/2018 | Bader-Natal | H04M 3/567 |
| 2019/0087054 A1* | 3/2019 | Gingawa | G06F 3/03545 |

* cited by examiner

200 —

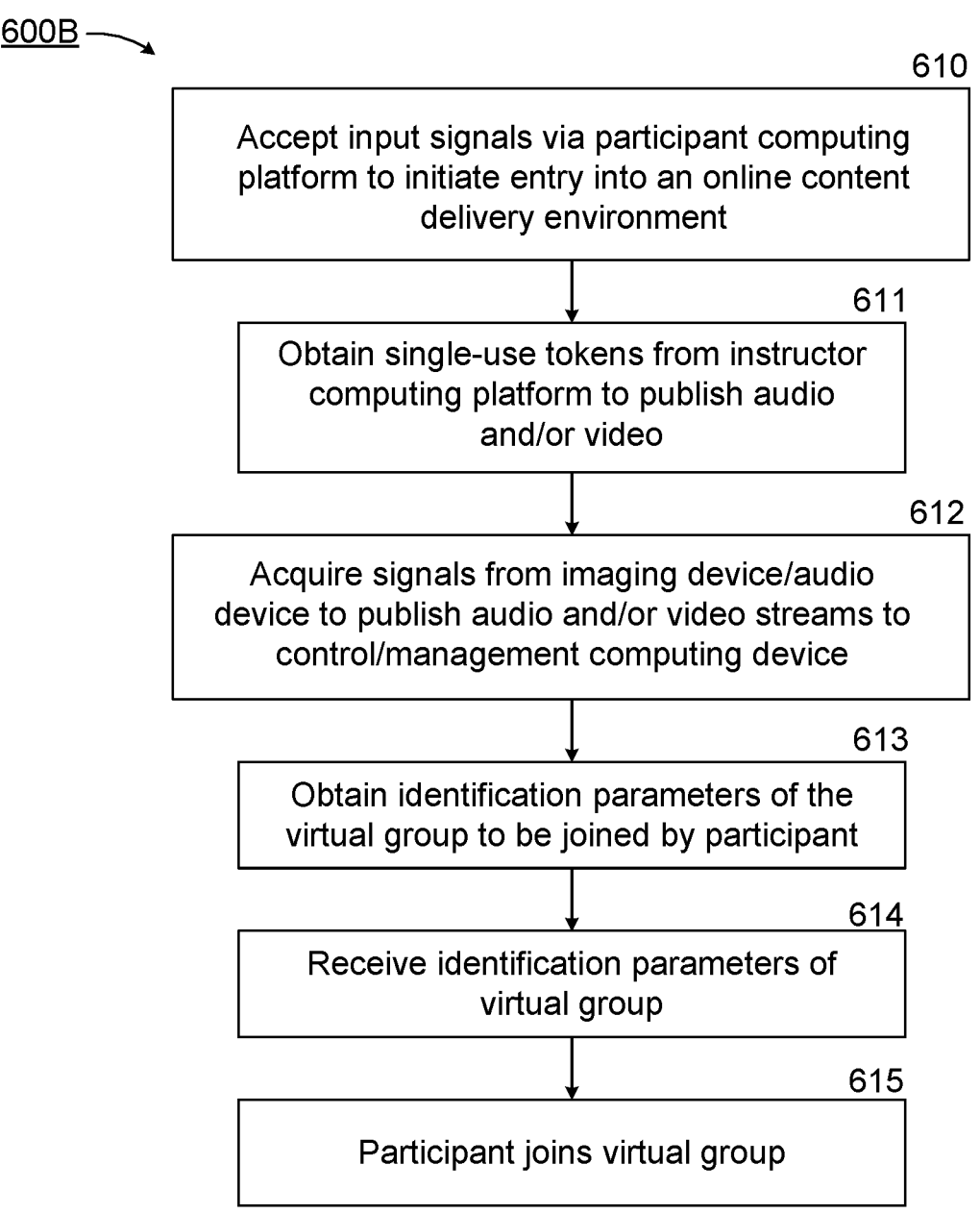

600B

610

Accept input signals via participant computing platform to initiate entry into an online content delivery environment

611

Obtain single-use tokens from instructor computing platform to publish audio and/or video

612

Acquire signals from imaging device/audio device to publish audio and/or video streams to control/management computing device

613

Obtain identification parameters of the virtual group to be joined by participant

614

Receive identification parameters of virtual group

615

Participant joins virtual group

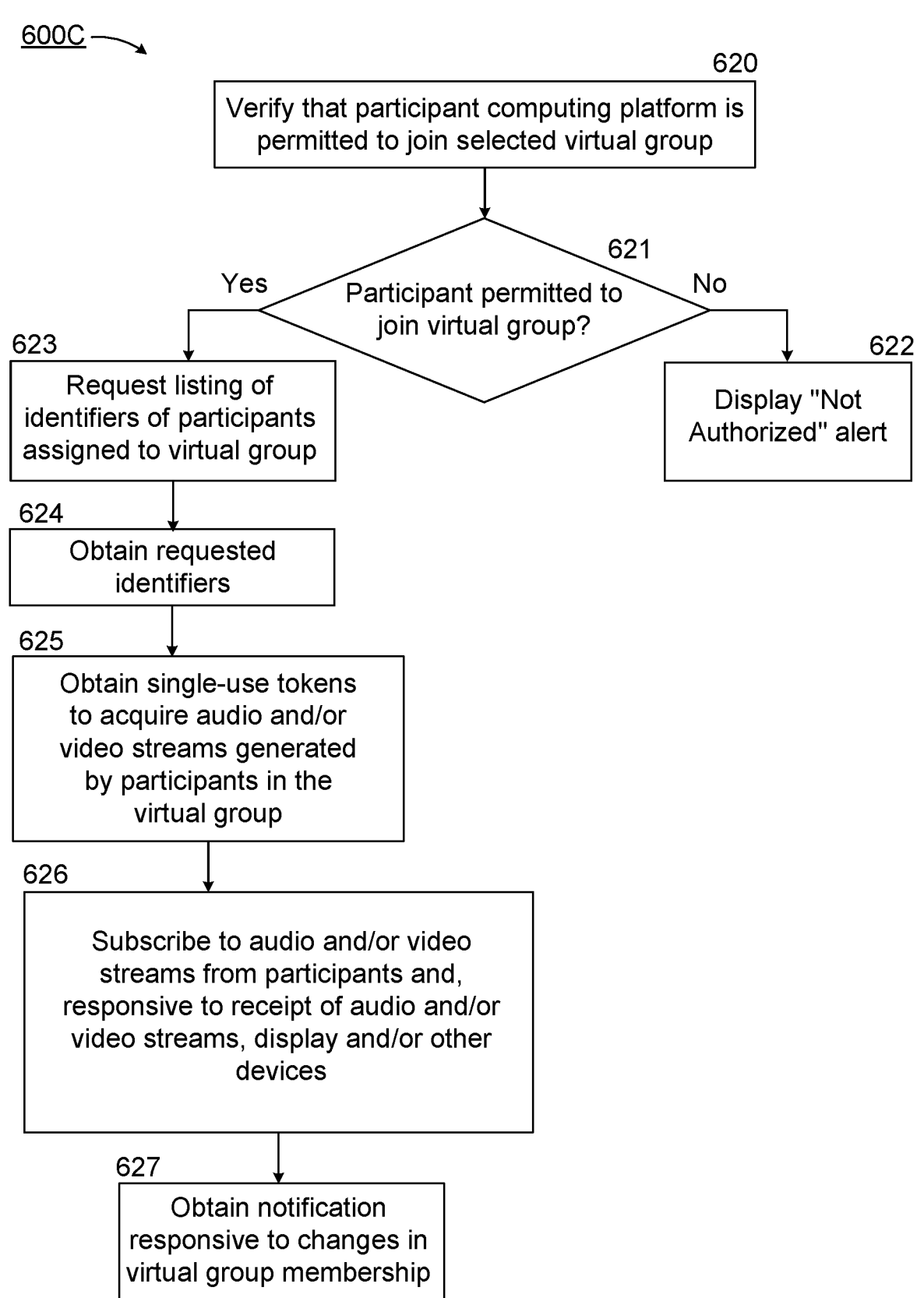

620
Verify that participant computing platform is permitted to join selected virtual group 621
Participant permitted to join virtual group?

Yes

No

623
Request listing of identifiers of participants assigned to virtual group

622
Display "Not Authorized" alert

624
Obtain requested identifiers

625
Obtain single-use tokens to acquire audio and/or video streams generated by participants in the virtual group 626
Subscribe to audio and/or video streams from participants and, responsive to receipt of audio and/or video streams, display and/or other devices 627
Obtain notification responsive to changes in virtual group membership

*FIG. 6C*

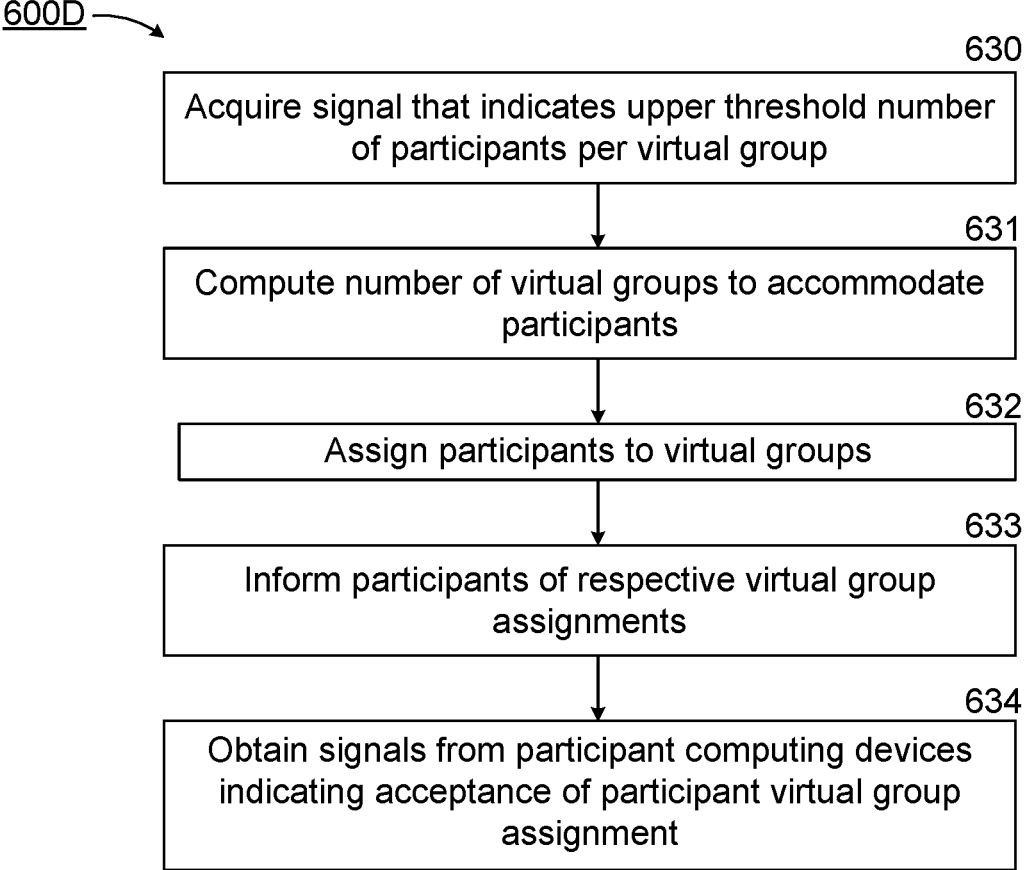

600D

630

Acquire signal that indicates upper threshold number of participants per virtual group

631

Compute number of virtual groups to accommodate participants

632

Assign participants to virtual groups

633

Inform participants of respective virtual group assignments

634

Obtain signals from participant computing devices indicating acceptance of participant virtual group assignment

*FIG. 6D*

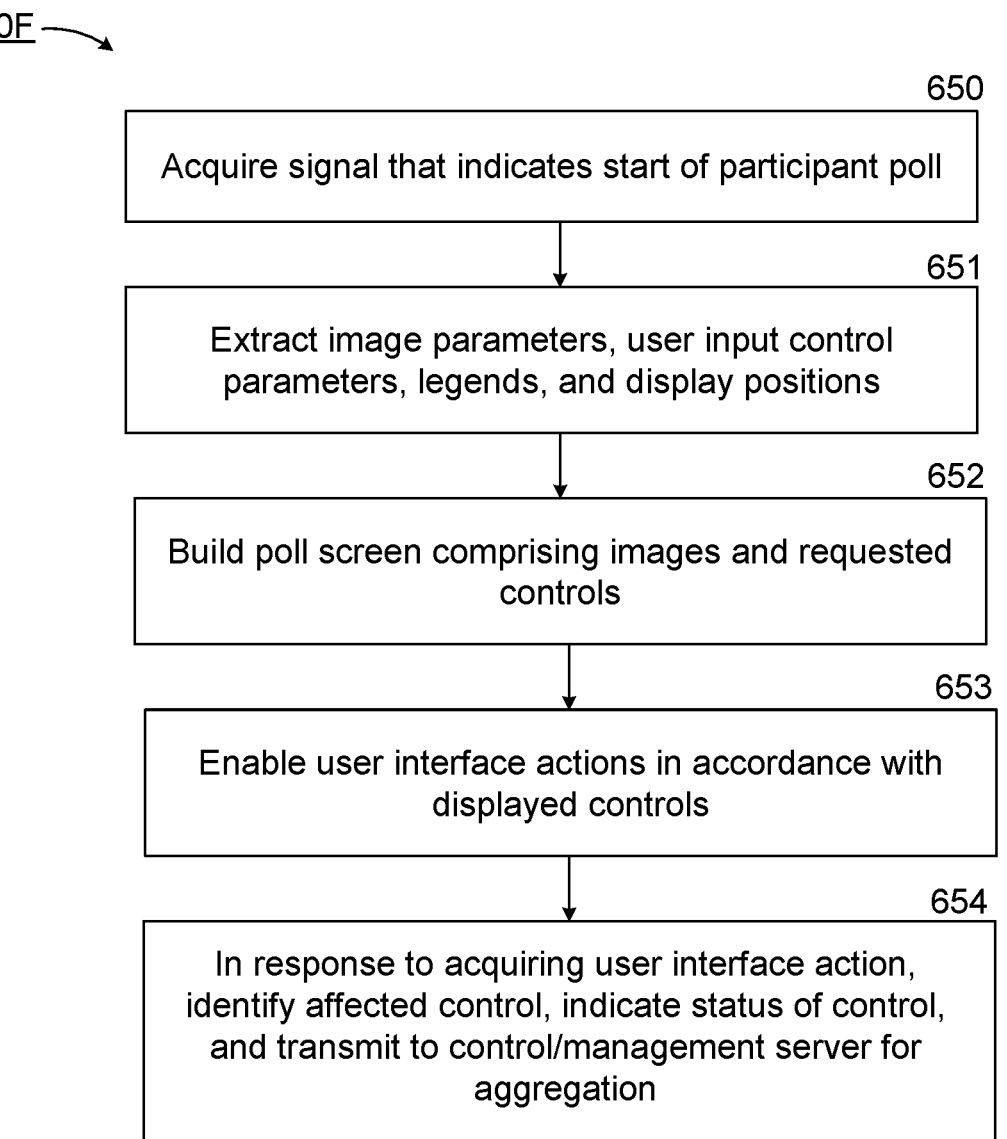

600F

650

Acquire signal that indicates start of participant poll

651

Extract image parameters, user input control parameters, legends, and display positions

652

Build poll screen comprising images and requested controls

653

Enable user interface actions in accordance with displayed controls

654

In response to acquiring user interface action, identify affected control, indicate status of control, and transmit to control/management server for aggregation

Figure 6G:
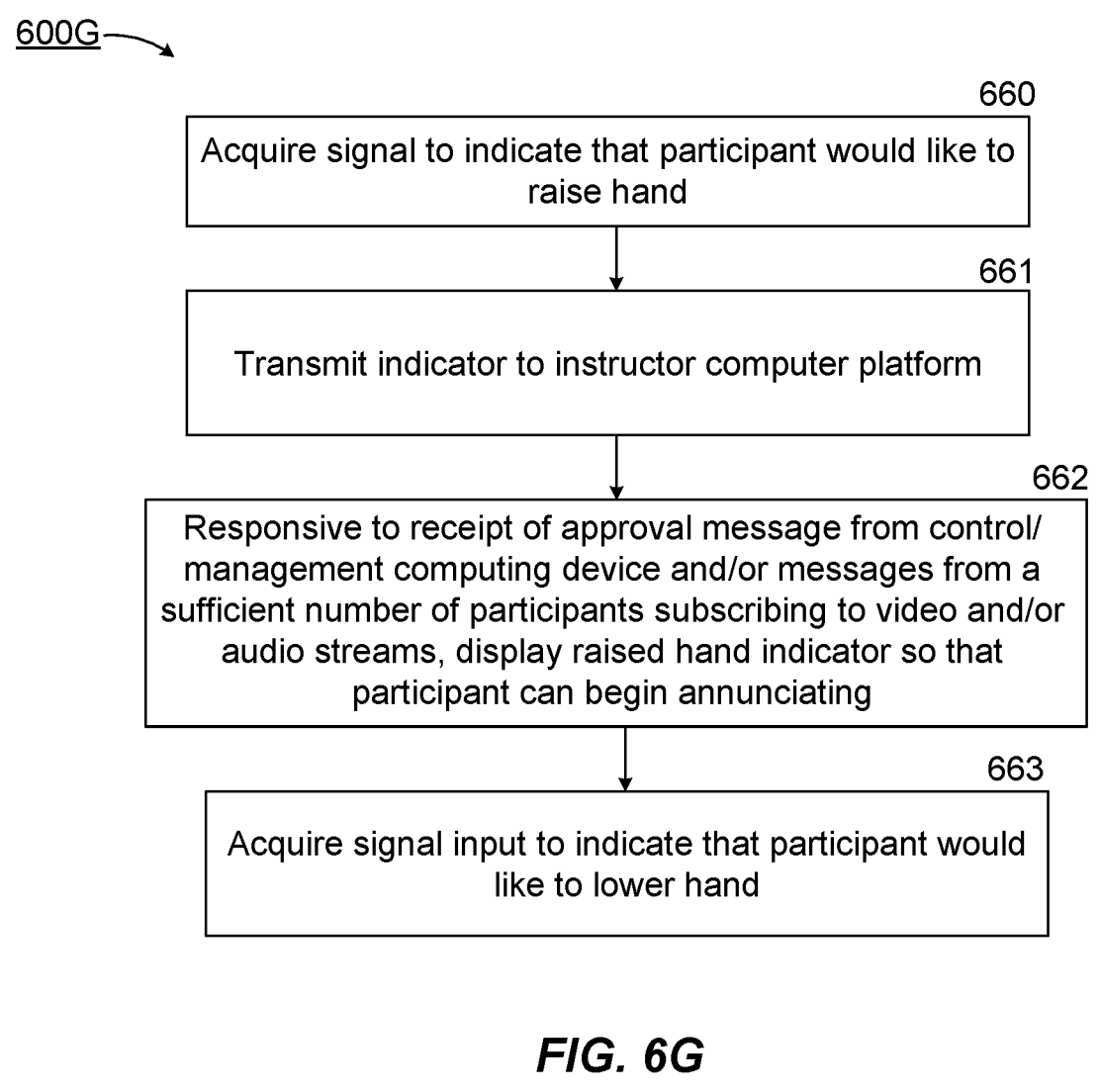

Acquire signal to indicate that participant would like to raise hand

661

Transmit indicator to instructor computer platform

662

Responsive to receipt of approval message from control/ management computing device and/or messages from a sufficient number of participants subscribing to video and/or audio streams, display raised hand indicator so that participant can begin annunciating

663

Acquire signal input to indicate that participant would like to lower hand

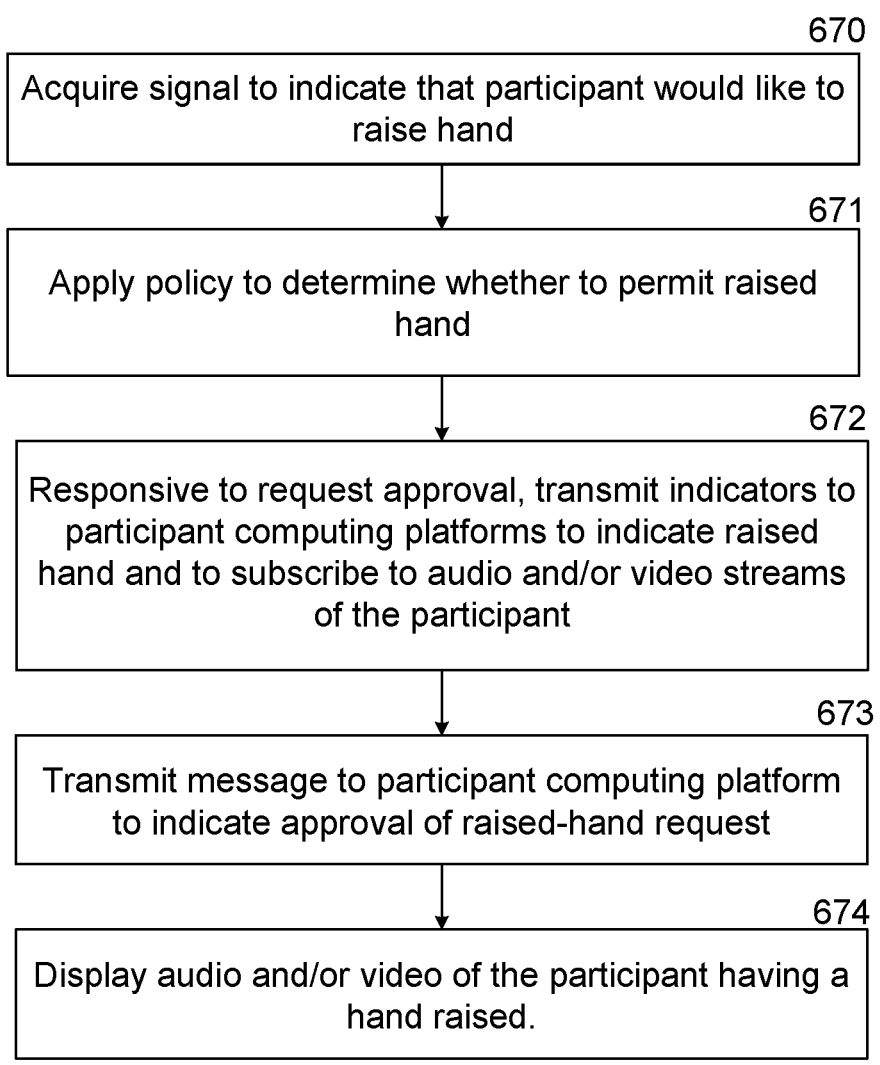

670

Acquire signal to indicate that participant would like to raise hand

671

Apply policy to determine whether to permit raised hand

672

Responsive to request approval, transmit indicators to participant computing platforms to indicate raised hand and to subscribe to audio and/or video streams of the participant

673

Transmit message to participant computing platform to indicate approval of raised-hand request

674

Display audio and/or video of the participant having a hand raised.

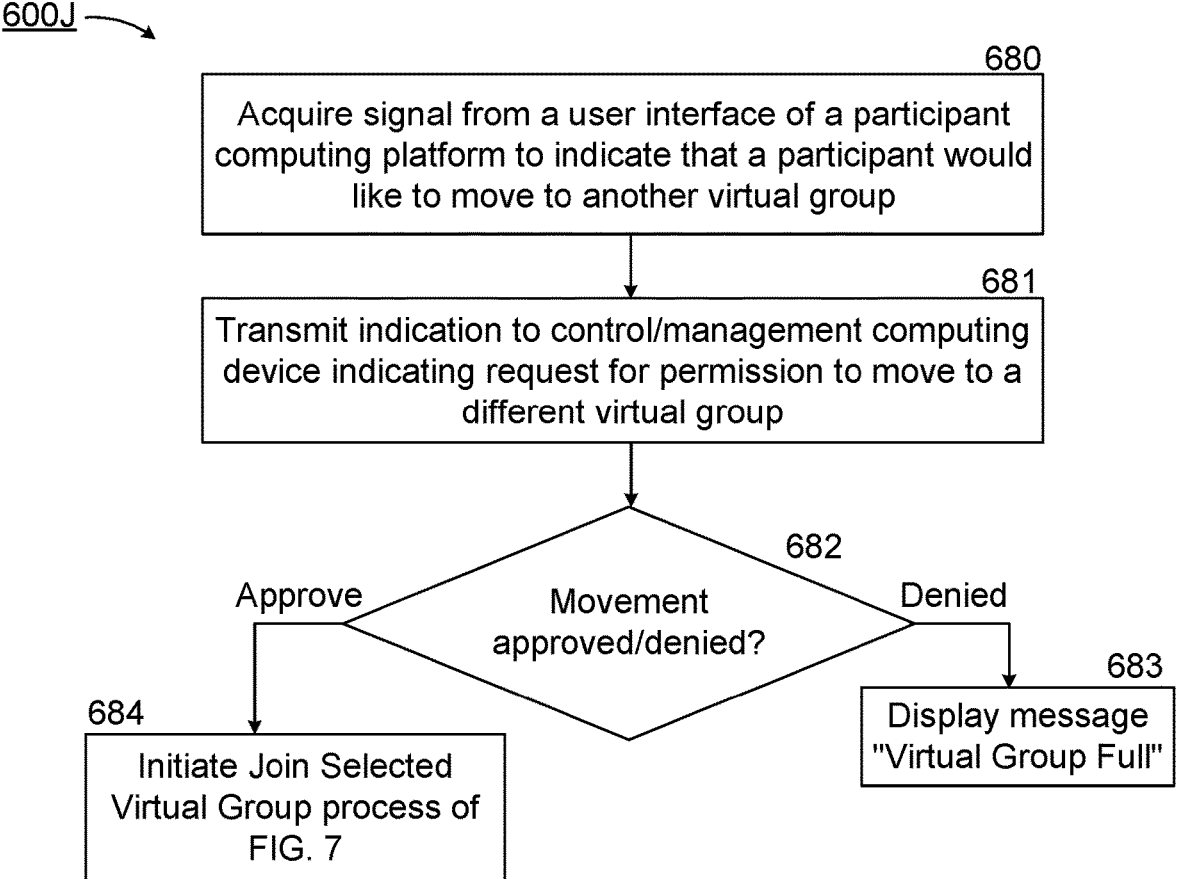

680

Acquire signal from a user interface of a participant computing platform to indicate that a participant would like to move to another virtual group

681

Transmit indication to control/management computing device indicating request for permission to move to a different virtual group

682

Movement approved/denied?

Approve

Denied

684

Initiate Join Selected Virtual Group process of FIG. 7

683

Display message "Virtual Group Full"

*FIG. 6J*

SYSTEMS AND/OR METHODS FOR ONLINE CONTENT DELIVERY

RELATED APPLICATIONS

This application claims priority to U.S. provisional patent application No. 63/049,087, filed Jul. 7, 2020, to U.S. provisional patent application No. 63/136,596, filed Jan. 12, 2021, and to U.S. patent application Ser. No. 17/368,749 (now U.S. Pat. No. 11,792,239), filed Jul. 6, 2021, each of which are incorporated by reference herein in their entirety and for all purposes.

BACKGROUND

1. Field

The present disclosure relates generally to online content delivery, such as to a geographically-dispersed audience and/or in combination with an in-person audience, in an educational setting, for example.

2. Information

Over the past several years, the Internet has developed into an important tool for facilitating the delivery of online content from a central location to, for example, a remotely located audience of participants or a combination of in-person and remotely-distributed audience. Thus, in an educational or academic setting, for example, an instructor can deliver content to an audience utilizing online conferencing hardware and/or software in an interactive, real-time environment. In such a setting, the audience, who may be dispersed over a wide geographical region, may have the ability to view pre-recorded content as well as content produced in real time, thus permitting content providers, such as educational institutions, to reach a wide ranging audience of participants who may be located in different states or provinces, different countries, different time zones, etc. Accordingly, content can be distributed for consumption by a large audience of participants in a manner that is convenient and efficient for the instructor as well as for the audience.

However, while content delivery may be possible utilizing current software and hardware ensembles, limitations of current technology often give rise to a content delivery/content consumption experience that is awkward and/or clumsy. Due, at least in part, to current technology limitations, replicating an in-class experience in a remote learning environment, for example, has not been achieved. Thus, development of content delivery technology, such as technologies that bring about rich features that provide a more seamless and more easily managed classroom experience, continues to be an active area of investigation.

SUMMARY

One general aspect includes a method for online delivery of content, including establishing an audio and/or video stream from one or more control/management computing devices to a plurality of participant computing platforms utilizing an electronic communications network. The method also includes subdividing, by the one or more control/management computing devices, the plurality of participant computing platforms into one or more virtual groups, a first virtual group of the one or more virtual groups acquiring the audio and/or video stream and exclusively sharing audio and/or video generated by one or more participants of the first virtual group between or among one or more other participants of the first virtual group.

In particular embodiments, the method may further include controlling, by the one or more control/management computing devices, whether one or more participants of a second virtual group of the one or more virtual groups acquires an audio and/or video stream generated by the one or more participants of the first virtual group. The method may further include acquiring, by an instructor computing platform cooperating with the one or more control/management computing devices, an audio and/or video stream generated by the one or more participants of the first virtual group. In particular embodiments, acquiring the audio and/or video stream generated by the one or more participants of the first virtual group occurs without notifying a participant of the first virtual group. In particular embodiments, subdividing the plurality of participant computing platforms into the one or more virtual groups occurs responsive to one or more of participant-selected subdividing, instructor-selected subdividing, random subdividing, scheduled-rotation subdividing, and diversity-driven subdividing. In particular embodiments, the method may additionally include displaying, at a display of an instructor computing platform, a machine-readable code. In particular embodiments, the method may include extracting, by the one or more control/management computing devices, instructions from the machine-readable code, the instructions directing a display device, of one or more of the plurality of participant computing platforms, to display one or more participant input fields of a participant interface. In particular embodiments, one or more participant input fields may correspond to a radio button, a checkbox, a text-entry field, or any combination thereof. In particular embodiments, the method may further include the one or more control/management computing devices accepting a participant response type, responsive to extracting the instructions from the machine-readable code at the display of the instructor computing platform. In particular embodiments, the accepted participant response type may correspond to the radio button, the checkbox, the text-entry field, or to any combination thereof.

In particular embodiments, the method may additionally include aggregating, by the one or more control/management computing devices, signals corresponding to the participant response type generated by one or more of the plurality of participant computing platforms. In particular embodiments, the machine-readable code may correspond to a quick response (QR) code. In particular embodiments, the method may additionally include detecting, by the one or more control/management computing devices, one or more participant interface events from a first participant computing platform. The method may also include aggregating the detected one or more participant interface events from the first participant computing platform. In particular embodiments, the method may additionally include detecting, by the one or more control/management computing devices, one or more participant interface events from a second participant computing platform. The method may also include aggregating the detected one or more participant interface events from the first participant computing platform and the detected one or more participant interface events from the second participant computing platform. The method may further include recording an image displayed on a display of a participant computing platform. The method may additionally include recording timing parameters in an audio and/or video stream corresponding to a time of the recording of the image. The method may additionally include storing the recorded image and the timing parameters. The method may additionally include forming an indicator that operates to access the stored recorded image and to initiate playback of the audio and/or video stream at the time of the recording of the image. The method may additionally include the recording of the image displayed on the display of the participant computing platform and may additionally include the recording of the timing parameters in the audio and/or video stream being performed without participant input in response to a change of the displayed image.

The method may further include synchronously displaying, to the plurality of participants, an audio and/or video stream, the audio and/or video stream including participant interface elements. The method may further include acquiring, at the one or more control/management computing devices, participant interface events with respect to the participant interface elements. The method may further include displaying a plurality of images, wherein each of the plurality of images corresponds to a participant of a plurality of participants. The method may further include aggregating, at the one or more control/management computing devices, the acquired participant interface events with respect to the participant interface elements. The method may further include displaying a representation of a participant on an instructor computing platform. The method may further include acquiring a signal, at the one or more control/management computing devices and in response to receiving a signal via a participant interface of the instructor computing platform, representing an instructor rating or grading of the participant displayed on the instructor computing platform. The method may also include storing the signal via the one or more control/management computing devices.

The method may further include acquiring, at the one or more control/management computing devices, a signal to indicate that a participant has joined a content delivery session after the content delivery session has been initiated. The method may further include acquiring a time signal indicating a point at which the participant has joined the content delivery session. The method may further include accelerating playback of an audio and/or video stream corresponding to an interim between the initiated content delivery session and the point at which the participant has joined the content delivery session. In particular embodiments, accelerating playback of the audio and/or video stream includes shortening gaps between spoken words in the audio stream. The method may further include detecting, via the one or more control/management computing devices, a hybrid content delivery session. The method may also include configuring an audio and/or video stream for moderated approval, in which an instructor approval signal precedes conveying an audio and/or video stream from a first participant to a second participant. Alternatively, the method may include configuring an audio and/or video stream for unmoderated approval in which an instructor approval signal does not precede conveying an audio and/or video stream from a first participant to a second participant. The method may additionally include transmitting the audio and/or video stream to remotely-located participants and to in-class participants or combination of both. The method may additionally include muting audio input devices simultaneous with transmitting the audio and/or video stream.

One general aspect includes a system for online delivery of content, including one or more processors coupled to at least one memory device to establish an audio and/or video stream from one or more control/management computing devices to a plurality of participant computing platforms via an electronic communications network and to subdivide the plurality of participant computing platforms into one or more virtual groups, in which a first virtual group of the one or more virtual groups is to acquire the audio and/or video stream and to exclusively share audio and/or video generated by one or more participants of the first virtual group between or among one or more other participants of the first virtual group.

In particular embodiments, the system may further permit control, by the instructor computing platform, over whether one or more participants of a second virtual group of the one or more virtual groups is to acquire an audio and/or video stream generated by the one or more participants of the first virtual group. In particular embodiments, the system may be further to acquire, by the instructor computing platform, an audio and/or video stream generated by the one or more participants of the first virtual group. In particular embodiments, subdividing the plurality of participant computing platforms into the one or more virtual groups occurs responsive to one or more of participant-selected subdividing, instructor-assigned subdividing, random subdividing, scheduled-rotation subdividing, and/or diversity-driven subdividing. In particular embodiments, the instructor can subdivide based on a response from a poll or a quiz. In particular embodiments, the instructor computing platform is additionally to generate signals representing one or more participants, in which the one or more participants is to correspond to one or more of the plurality of participant computing platforms. In particular embodiments, the system may be further to initiate display, at a display of the instructor computing platform, of a machine-readable code. In particular embodiments, the system may direct display, at a display device of one or more of the plurality of participant computing platforms, of one or more components of a participant interface to be based, at least in part, on the machine-readable code displayed on the display of the instructor computing platform. In particular embodiments, one or more components of the participant interface are to correspond to a radio button, a checkbox, a text-entry field, or any combination thereof. In particular embodiments, the system may be further to establish a participant response type, responsive to initiating display of the machine-readable code at the display of the instructor computing platform. In particular embodiments, the participant response type is to correspond to the radio button, the checkbox, the text-entry field, or any combination thereof. In particular embodiments, the system may further aggregate, by the instructor computing platform, signals corresponding to the participant response type generated by one or more of the plurality of participant computing platforms.

One general aspect relates to an article that includes a non-transitory storage medium having instructions stored thereon, which are executable by a special-purpose computing platform to establish an audio and/or video stream from an instructor computing platform to a plurality of participant computing platforms utilizing an electronic communications network. The instructions may additionally bring about subdividing, by the instructor computing platform, the plurality of participant computing platforms into one or more virtual groups, in which a first virtual group of the one or more virtual groups is to acquire the audio and/or video stream and to exclusively share audio and/or video generated by one or more participants of the first virtual group between or among one or more other participants of the first virtual group.

A general aspect of claimed subject matter refers to a virtual classroom system that utilizes a virtual conferencing service to establish audio and/or video connections between the plurality of client computing devices during a virtual classroom. In an embodiment, each of the client computing devices is operated by at least one participant in the virtual classroom. The virtual conferencing service further includes a capability to subdivide the participants in the virtual classroom into a plurality of virtual groups, in which, unless specific participants and/or the instructor choose otherwise, video and audio streams of the participants can be seen and heard, respectively, exclusively between participants in the same virtual group. In addition, the instructor and/or another entity (such as the co-instructor, teaching assistant, etc.) can choose to enable or disable the ability of some or all the participants to see and/or hear the instructor and/or a specific student participant and/or a group of student participants. In particular embodiments, participants can choose to broadcast their personal video only to the instructor and/or the virtual group while refraining from broadcasting video to other participants.

In particular embodiments, an online content delivery session provides capabilities to measure student participant engagement. Student participant engagement may include any actions performed by a student participant, such as providing a comment, raising their hand, posting a question, sharing reactions with an emoji, providing an answer, entering text into a text field, or any other measurable interaction of a student participant with, for example, the user interface elements of a participant computing device. In particular embodiments, measurements of student participant engagement may be utilized as input signals to machine learning algorithms and/or processes which, over time, are modified to bring about increased levels of participant or student engagement during content delivery sessions. Thus, for example, if particular activities, such as displaying certain video segments, and/or if particular timing constraints between or among activities are observed (such as when student tests, quizzes, and so forth are administered) as being instrumental in enhancing student participant retention, or enhancing student participant grades, machine learning may be utilized to ensure that such activities and/or timing constraints are repeated and/or emphasized so as to continue to maximize student participant learning outcome.

It should be noted that claimed subject matter is intended to embrace a wide variety of metrics of student engagement, such as may be measured using instruments such as those that track a student participant's gaze in the direction of a student participant's computer display, interactions with pause/rewind controls, quiz results, short test results, sharing content within a virtual group, posting questions, answering questions, taking notes, annotating on screenshots, such as those that may be utilized to determine whether a student participant is paying attention, questions asked and/or answered by the students, feedback to the instructor provided by the student, results of assessments and any other methods based on analyzing student's digital behaviors including viewing or using websites, resource and applications approved (or not approved) by the instructor.

In particular embodiments, student participant attendance to an online content delivery session may be based, at least in part, on student participant engagement metrics, which may be set utilizing configurable policies. Accordingly, rather than an instructor engaging in a time-consuming task of recording attendance, student participant interactions with interface devices of a participant computing platform, such as mouse clicks, completing polls, entering text into a text-entry field, and so forth may be used in lieu of an instructor formally recording student attendance. In particular embodiments, during an initial portion of a content delivery session, an instructor may request that student participants complete a short quiz, a poll or and interactive exercise, which may function as a warm-up as well as functioning as an approach to determining student participant attendance.

In particular embodiments, student participants may be arranged by the instructor, co-instructor, or teaching assistant, for example, into a plurality of groups, wherein each of the plurality of groups includes attributes of differing access privileges to system functions. For example, student participants of a first group may not be permitted to ask questions, chat, raise their hand, etc. during live content delivery sessions. However, student participants of the first group may, for example, have the capability to communicate with one another. Forming such groups having differing access privileges may be useful in permitting prospective students to audit a course, view course lectures to evaluate whether the course lectures and activities would satisfy their own academic needs, or for any other rationale, and claimed subject matter is not limited in this respect. In some instances, such prospective student participants may be contacted by the institution providing the online content delivery for promotional purposes. In some instances, information about such prospective students is collected, for example, engagement measurements and/or student performance and assessments. Prospective student information may be analyzed to provide insight into an average or typical student participant.

In particular embodiments, measurements of student engagement may be presented to the instructor in terms of visual aids, such as a graph illustrating the number of participant students who have raised their hand in the last hour, the number of students answering particular polling questions, the number of mouse clicks from particular student participants, and so forth. Such visual aids may additionally relate to how many participant students are at least partially engaged versus how many participant students are engaged to a lesser extent, or perhaps are not engaged at all. Visual aids may also relate to real time statistics, such as presenting a graph to an instructor indicating the number of students have not yet answered an ongoing poll question, the number of students that have not completed a quiz, just as examples. In particular embodiments, an instructor, teaching assistant, etc. may be alerted responsive to the online content delivery service determining, such as via machine learning, that one or more student participants are not viewing and/or not working on relevant materials.

In particular embodiments, instructors may be capable of monitoring activity in virtual groups by way of one or more control/management computing devices computing an activity score. In particular embodiments, an activity score may represent a metric of a student participant's interaction with user interface elements, for example, during the content delivery session. Accordingly, student participants that regularly raise their hands, provide comments via a chat function of a virtual classroom, promptly provide answers to quizzes, promptly enter text into text entry fields, etc., may increase student activity scores, while student participants that seldom raise their hands, provide comments, etc., may be assigned lower student activity scores.

In particular embodiments, student participants may elect to receive audio and/or video streams exclusively from particular other student participants, instructors, teaching assistants, and so forth. Such selections may reduce distractions and allow at least particular student participants to increase concentration and focus on particular aspects of provided content, such as answering class-wide questions posed or authorized by an instructor, co-instructor, teaching assistant, etc.

In particular embodiments, student participants in a virtual group can provide peer ratings, for example, of other student participants of a virtual group. In particular embodiments, members of virtual groups are selected randomly by one or more control/management computing devices, or may be selected by an instructor, co-instructor, teaching assistant, and so forth. In other embodiments, members of virtual groups may be selected so as to maximize diversity, ensure that subject matter experts are spread among virtual groups, or based on any other criteria.

In particular embodiments, perhaps in response to one or more participants from virtual groups posing a number of questions to an instructor, co-instructor, teaching assistant, etc., student participants of a virtual group may be capable of designating particular questions as high-priority while designating other questions as lower priority. Such priority designation may ensure that an instructor answers more important questions first, such as before a time limit for an online content delivery session expires. In some instances, particular questions may be routed to subject matter experts, teaching assistants, etc., so as to provide answers to virtually all questions posed by student participants. In some instances, subject matter experts, teaching assistants, etc. may operate to vet questions posed by student participants, such as prior to forwarding questions to an instructor.

In particular embodiments, content delivery sessions may be recordable, such as by student participants, instructors, co-instructors, etc. However, within the context of such recordable sessions, certain students, such as student participants who are more cautious, reserved, or introverted may elect to refrain from having their video streams recorded.

In particular embodiments, content delivery sessions may be pre-recorded for later use by student participants. Additionally, any polls, quizzes, exams, etc., may also be recorded as an integral function of such recordings. Accordingly, for example, if a student participant has missed a lecture, along with missing an opportunity to provide comments and/or an opportunity to complete a quiz offered during a portion of the lecture, a control/management computing device may administer the pre-recorded lecture to a student participant as well as any exams and/or quizzes. Accordingly, a student participant viewing a pre-recorded lecture may obtain the benefits of viewing and/or hearing the lecture as well as obtaining the benefit of completing a quiz, exam, or completing any other type of engagement as though the student had attended the lecture in real time. In particular embodiments, an entire series of lectures, may be recorded and leased, sold, organized into one or more digital audio files made available on the Internet for downloading to a computer or mobile device (e.g., a podcast) or may be monetized in some other fashion. In particular embodiments, these recorded sessions can be facilitated and/or administered by another instructor or by a teaching assistant, so as to pause, explain, and/or to answer questions In particular embodiments, a student participant may obtain a screenshot or other type of image of visual content provided by an instructor. In addition, a student participant may additionally obtain and store any relevant notes, annotations, highlights, or any other types of markings which may emphasize certain content. Such relevant notes, annotations, highlights, etc. can be time stamped and/or linked with instructor-provided content so as to provide a student participant reviewing the notes an ability to hear audio content and/or view video content present at the time the notes, annotations, highlights, etc., were recorded so as to provide context to any recorded notes, annotations, highlights, etc. In particular embodiments, a student participant can choose to share their notes and/or annotations to a group, or to an entire list of authorized participants.

In particular embodiments, an online content delivery system may include a repository system to permit storage of instructional materials such as video segments, completed polls, completed quizzes, completed exams, documents, questions and answers, discussions, completed projects undertaken by virtual groups. Such a repository may further permit storage of recommendations that relate to key points in online content delivery sessions as to when such additions ought to be brought forth. In addition, student engagement with respect to such materials may also be stored. The repository system may thus offer instructors and/or other interested parties pertinent analyses, learnings and/or recommendations, such as from past classes/sessions based on engagement measurements obtained during the use of such materials. In particular embodiments, the repository may track engagement triggering events, such as display of certain types of images and/or video segments, and participant engagements (e.g., polls, quizzes, content, documents, mouse clicks, comments, chat messages and so forth) that occur in response to particular triggering events. In particular embodiments, machine learning may be utilized to analyze prerecorded content delivery sessions and to provide suggestions for improvement that may include insertion of materials from the repository into an online content delivery session. In particular embodiments, machine learning techniques may be utilized to analyze instructor-provided teaching notes and/or class syllabuses, so as to provide suggestions for improvement that may include insertion of materials from the repository, such as polls and quizzes, into an online content delivery session.

In particular embodiments, machine learning techniques may be employed to analyze and/or evaluate recorded classes and to extract relevant video segments that provide subject matter related to particular instructor questions. Machine learning techniques can include keyword search algorithms, in which an audio stream is analyzed to obtain particular words, phrases, etc. Machine learning techniques may also include image recognition approaches, in which video segments are analyzed to determine portions of a video segment that relate to images useful in answering particular questions. It should be noted that claimed subject matter is intended to embrace all types of machine learning techniques, virtually without limitation.

In particular embodiments, machine learning approaches may be utilized to enhance student engagements based, at least in part, on parameters relevant to an instructor's presentation style. In one instance, responsive to an instructor speaking, perhaps monotonously, for a predetermined duration, a control/management computing device may provide a suggestion to an instructor to initiate a poll question, a short quiz, or engage in some other activity that may ensure that student participants remain engaged in the online content delivery session. Poll questions, short quizzes, or other activities may be drawn from a repository of prerecorded online content. In another instance, a control/management computing device may suggest that an instructor vary the pitch of their voice, so as to ensure that an instructor's voice remains of interest to a student participant. In another instance, a control/management computing device may automatically (e.g., without instructor input) vary the pitch of an instructor's voice. In particular embodiments, a control/management computing device may include an input port to accept audio and/video content from guest lecturers, for example.

In particular embodiments, an instructor may share lists of uniform resource locators (URLs) with student participants as well as providing links to other materials relevant to the subject matter presented during a content delivery session. In particular embodiments, student participants may utilize a standalone laptop computer, desktop computer, or other computing resource to access audio and/or video streams during a content delivery session or may utilize, for example, a mobile computing device, such as a mobile communications device as further described herein. Further, particular embodiments may utilize first and second display devices, such as a laptop computer cooperating with a mobile computing device, which may provide complementary information such as relevant chats, status information, and so forth. In certain embodiments, audio and/or video streams may be cast from, for example, a laptop or desktop computer or mobile device to a smart TV or other device used predominantly for displaying content. In particular embodiments, although a group of student participants (e.g., three, four, or five) may be viewing the lecture utilizing a smart TV, each student participant may use their own personal device, such as a laptop computer, desktop computer, or a mobile communications device to participate in polls, select radio buttons, provide short answers, and so forth.

In particular embodiments, software components of student participant computing devices, computing devices utilized by instructors, co-instructors, teaching assistants, or the like, as well as control/management computing devices may be hosted by computers at different geographic locations. In particular embodiments, audio and/or video content (such as audio segments or clips, video segments or clips) may be uploaded to one or more control/management computing devices prior to the start of a content delivery session. Audio and/or video content may be streamed directly from, for example, the one or more control/management computing devices during content delivery session, which may thereby ensure that streamed audio/video meets or exceeds quality thresholds.

In particular embodiments, an instructor, co-instructor, or teaching assistant, for example, may be capable of viewing real-time images of student participants during content delivery sessions. In an embodiment, a first number (a gallery) of students may be displayed to an instructor during a first duration, followed by a second number of student participants displayed to an instructor during the second duration. In particular embodiments, groups of student participants may be automatically (e.g., without user input) cycled so that an instructor, for example, can view all student participants in a virtual class at regular or irregular intervals. With respect to a hybrid content delivery environment, in which some student participants are co-located with an instructor in a classroom while other student participants are remotely located, co-located student participants may be highlighted while remote participants are displayed without highlighting. In an embodiment, with respect to hybrid content delivery, responsive to students that are co-locate with the instructor speaking, or asking questions, all audio input devices, such as laptops, mobile phones that are proximate to the student may be automatically needed to enable remote participants to hear that co-located participant clearly.

In particular embodiments, an instructor, for example, may assign tasks for student participants to perform collaboratively utilizing a shared workspace, perhaps without the need to break into separate, virtual groups. Instructors may, for example, deactivate an audio and/or video feed between an instructor and collaborating participants. In one example, an instructor can provide groups of collaborating participants with a corresponding number of portions of a larger document so as to permit each group to, for example, review and comment upon a separate section of the document, or to review and comment upon a document that is unique to that group. For example, in response to reviewing a portion of a document, an instructor may request that each of the groups of collaborating participants complete a questionnaire, poll, quiz, short answer, etc., that is relevant to the particular portion of the document reviewed by the corresponding group of collaborating participants.

Particular embodiments may permit student participants to operate asynchronously at times other than during real-time content delivery sessions, in which, for example, a first student participant may be capable of leaving a video recording, voicemail, chat message, text message, or any other type of message and/or content for a second user. In some instances, student participants may be capable of applying changes to documents or other types of work product generated in collaboration with other student participants.

A general aspect of claimed subject matter refers to a remote student participant monitoring system comprising a virtual conferencing service to establish audio and/or video connections between a plurality of student participants during a remote monitoring session. The remote student participant monitoring system includes a plurality of competing platforms, each operated by at least one participant in the remote student monitoring session. The virtual conferencing service further includes a capability for one or more supervisors to view the contents of each of the students being monitored The virtual conferencing service further includes capabilities to measure student behavior.

In particular instances, the virtual conferencing service may provide a capability to alert, if needed, a person nearby the student, for example by sending a text message from the virtual conferencing service. In particular embodiments, a student participant prepares and/or is assigned a set of tasks to perform during a monitoring session. A supervisor, for example, may be capable of tracking the student participant's progress on completing the tasks. In particular embodiments, in which a virtual group is assigned a set of tasks to perform, one or more instructors can track the progress made, and instructors can choose to share the progress reports with some or all of the student participants in the virtual classroom. In particular embodiments, an instructor, co-instructor, and/or teaching assistant may be alerted responsive to determining, utilizing techniques such as machine learning and/or heuristics, that the student participant has not viewed the display of a computing device and/or the display of a mobile communications device for a pre-specified period of time. In particular embodiments, an instructor, co-instructor and/or teaching assistant may be alerted responsive to determining that the student participant has not been present proximate to the computer and/or mobile device for a pre-specified period of time.

In particular embodiments, a recording of a content delivery session may be summarized by manual editing and/or automated editing of a class recording such as a particular student participant's engagement in the presented material, feedback provided by the student participant and/or other metrics. In particular embodiments, audio and/or video segments may be paused, and/or rewound during a live content delivery session. In particular embodiments, student participants may be capable of rewinding or backing up a real time audio and/or video stream during a live content delivery session. In particular embodiments, responsive to a student rewinding a live session, the online content delivery system may catch up to the live stream by increased playback speeds, and/or by eliminating gaps between words or phrases.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

FIG. 6B is a flowchart for a participant classroom entry process in a system for online content delivery, according to an embodiment.

FIG. 6C is a flowchart for a process of virtual group entry in a system for online content delivery, according to an embodiment.

FIG. 6D is a flowchart for a process in which a virtual group may be rearranged in a system for online content delivery, according to an embodiment.

FIG. 6F is a flowchart for a process of virtual group polling, from the perspective of a participant computing platform in a system for online content delivery, according to an embodiment.

FIG. 6G is a flowchart for a process of acknowledging a participant to raise their hand, from the perspective of a participant computing platform in a system for online content delivery, according to an embodiment.

FIG. 6H is a flowchart for a process of acknowledging a participant to raise their hand, from the perspective of an instructor computing platform in a system for online content delivery, according to an embodiment.

FIG. 6J is a flowchart for a process of permitting a participant to move from a first virtual group to a second virtual group, from the perspective of a participant computing platform in a system for online content delivery, according to an embodiment.

Figure 1:
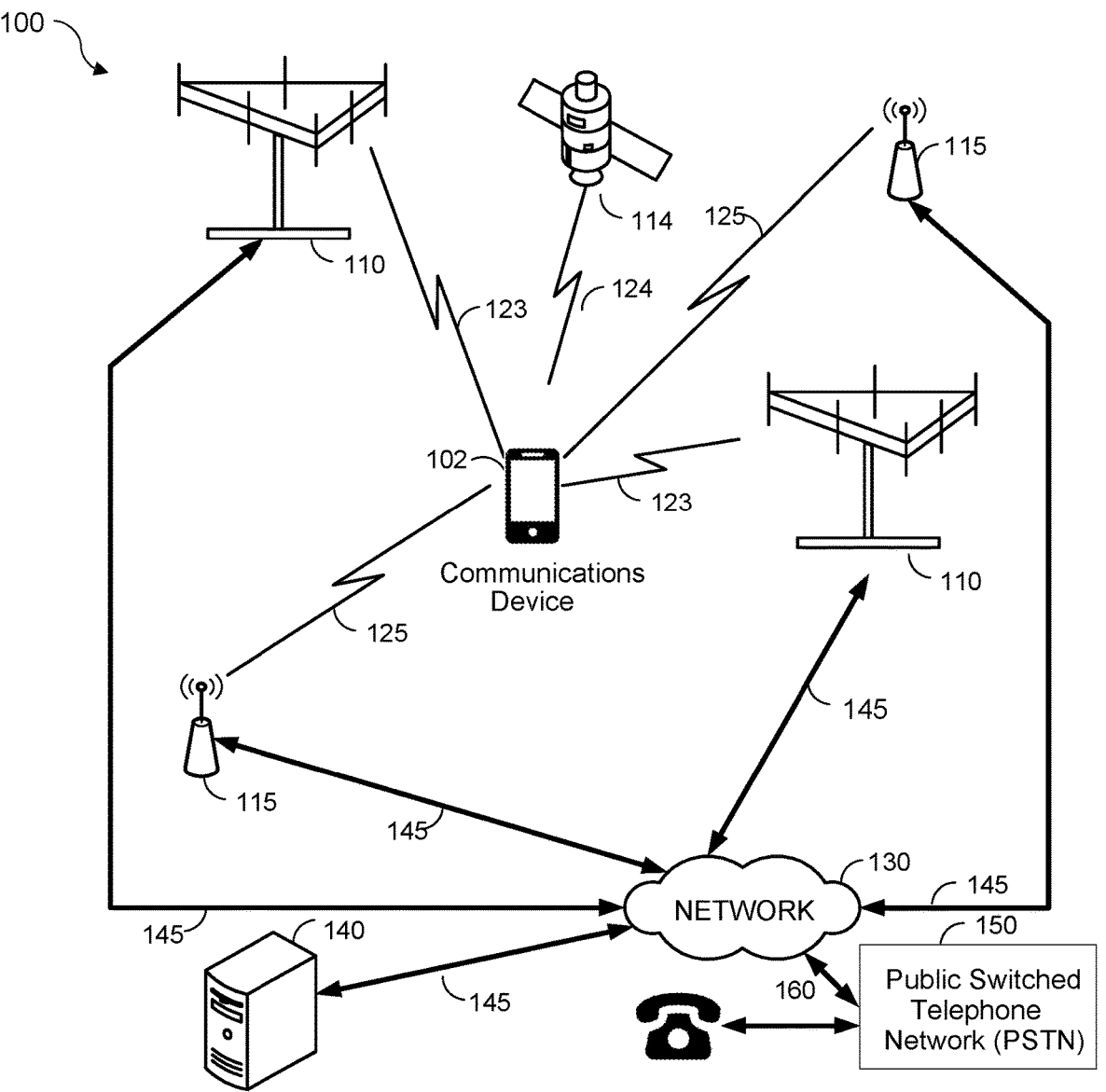
FIG. 1 is a diagram of a communications infrastructure that includes both wireless and wireline communications devices, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc., may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, in recent years, the Internet has developed into an important tool for facilitating the delivery of online content from a central location to, for example, an audience dispersed over a wide geographical area. For example, in an enterprise setting, a team leader may convene an online conference or meeting to discuss changes or to provide updates with respect to certain practices and/or processes utilized by the enterprise. In another example, in an educational or academic environment, for example, an instructor may teach an entire course, for example, without a need for students/participants to be physically present in a classroom or lecture hall. In such settings, an audience of participants, students, team members, etc., who may be dispersed over a wide geographical region, may have an ability to view pre-recorded content as well as content generated in real time. Accordingly, content providers, such as team leaders, instructors, educational institutions, office-holders etc., may be capable of reaching a wide ranging audience located in different states or provinces, countries, and/or time zones. Accordingly, content can be distributed for consumption by a large audience of participants in a manner that is convenient and efficient for content presenters as well as for the audience.

However, also as previously alluded to, while content delivery may be possible utilizing current software and hardware arrangements, current technologies may fall short of providing a satisfying content delivery experience. For example, during an initial portion of a content delivery session, such as prior to delivering a lecture in an educational setting, an instructor, for example, may be required to perform time-consuming screening procedures to ensure that all members of an audience are legitimate, authentic students, rather than casual, unauthorized, or unexpected individuals. In addition, while a lecture or other type of content delivery session is in progress, an instructor, for example, may mute all members of an audience so as to preclude any type of real time collaborative discussions between and/or among audience members. Accordingly, breakout groups, in which participants learn by working together on a project or subproject, is not possible during a lecture or other type of content delivery session. Further, while a lecture or other content delivery session is in progress, an instructor as well as audience participants may be limited to viewing identical materials. However, at times, an instructor may wish to view materials intended for the exclusive use of the instructor, such as a "teacher's edition," while participants view materials exclusively intended for participants in the audience. Thus, for a variety of reasons, such as those discussed hereinabove, online content delivery to an audience can often be perceived as providing an instructor and/or audience participants with an experience that is rife with shortcomings.

Hence, in particular embodiments of claimed subject matter, online content delivery may be conducted in a manner that more closely represents a classroom environment that streamlines various aspects of content delivery from an instructor and/or one or more control/management computing devices, for example, to an audience of participants. For example, as discussed in greater detail hereinbelow, participant access to an online classroom may be conducted through one or more control/management computing devices, which removes the burden of participant authentication from an instructor. Accordingly, such authentication may permit an instructor to increase the focus on actual, to-be-delivered content, rather than being required to attend to the task of authenticating participants.

In addition, in particular embodiments, an instructor may be permitted to subdivide participants into a plurality (e.g., one or more) virtual groups, which may, in turn, permit groups of participants to collaborate in smaller group environments, such as a virtual group comprising a maximum of four participants, five participants, 10 participants, or any other threshold number of participants. In such a scenario, an instructor may be capable of transmitting and/or receiving a message or an audio and/or video stream to or from a particular participant within the group, or to an entire virtual group, so as to provide individual attention to the participant or to the virtual group. In particular embodiments, subdividing of participants into virtual groups may be performed by an instructor (via one or more control/management computing devices), in which an instructor may be capable of selecting particular participants as leaders of a virtual group as well as selecting particular individuals for other roles within a given virtual group. Thus, for example, responsive to an instructor determining that a virtual group would likely benefit from a subject matter expert, the instructor may assign the subject matter expert to the virtual group. In another example, an instructor may determine that a particular participant, such as a participant that would benefit from some amount of remedial tutoring, may be assigned to a particular virtual group that may be equipped to provide such tutoring. In other instances, participants forming a virtual group may be selected on other bases, such as a desire to maintain a minimum level of diversity within a virtual group. In other instances, a virtual group may be formed responsive to a randomization process, in which participants are randomly assigned to a virtual group. In other instances, members of virtual groups may be scheduled for rotation at regular or irregular increments in time, such as every 10 minutes, every 20 minutes, or at any other convenient interval. In other instances, a virtual group may be formed and/or organized by individual participants, thereby providing a level of freedom to participants to form/organize virtual groups for according to their own rationale. It should be noted that claimed subject matter is intended to embrace formation of virtual groups based on these criteria and/or other criteria not specifically described hereinabove.

In some instances, audio and/or video streams generated by members of the one or more virtual groups may be utilized exclusively by the members of a particular virtual group, thereby permitting the virtual groups to collaborate without being distracted by audio and/or video streams generated by members of other virtual groups. In particular embodiments, an instructor may be capable of acquiring an audio and/or video stream generated within a virtual group so as to monitor progress of the virtual group. In particular embodiments, acquisition of an audio and/or video stream from a virtual group may be performed unbeknownst to participants of the virtual group. In particular embodiments, such unannounced listening of an audio stream and/or viewing of a video stream by an instructor may allow the instructor to gain insight into the progress and/or workings of a particular virtual group. Further, in some embodiments, responsive to an instructor determining that an audio and/or video stream generated by a member of a virtual group could be of benefit to other virtual groups, the instructor may permit the generated audio and/or video stream to be available to the members of other virtual groups. For example, particular embodiments may facilitate a virtual debate, wherein a designated individual within each virtual group, of a plurality of virtual groups, presents or discusses particular findings for the benefit of the participants of other virtual groups.

In particular embodiments, online content delivery may be performed within a communications infrastructure utilizing computing platforms, servers, routers, wireless communications resources, wireline communication resources, and other components of a communications infrastructure. Accordingly, an instructor computing platform and one or more control/management computing devices, such as described further hereinbelow may maintain a wireless or wireline connection with participant computing platforms. Further, participant computing platforms may maintain a wireless or wireline connection with an instructor computing platform and/or with control/management computing devices(s). Accordingly, FIG. 1 is a diagram of a communications infrastructure that includes both wireless and wireline communications devices, according to various embodiments. In FIG. 1, which corresponds to embodiment 100, communications device 102, which may represent an instructor computing platform or may represent a participant computing platform, may transmit radio signals to, and receive radio signals from, a wireless communications network. In an example, communications device 102, operated by perhaps an instructor or a participant in an online content delivery system, may communicate with a cellular communications network by transmitting wireless signals to, and may receive wireless signals from, cellular transceiver 110, which may comprise a wireless base transceiver subsystem, a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communications device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communications device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transceiver 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communications device 102 based on these location related measurements. In some implementations, location related measurements obtained by communications device 102 may be transferred to a location server such as an enhanced serving mobile location center (E-SMLC) or SUPL location platform (SLP) (e.g. which may comprise a server, such as server 140) after which the location server may estimate or determine an estimated location for communications device 102 based on the measurements. In the presently illustrated example, location related measurements obtained by communications device 102 may include measurements of signals 124 received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OT-DOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to PSTN 150, for example, via wireless communication link 123 and communications link 160.

A mobile device at a call source (e.g., communications device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., communications device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

Communications device 102 may also include a sensor suite, which may, for example, include inertial sensors and environment sensors. Inertial sensors of communications device 102 may comprise, for example accelerometers (e.g., collectively responding to acceleration of communications device 102 in and x-direction, a y-direction, and a z-direction). Communications device 102 may further include one or more gyroscopes or one or more magnetometers (e.g., to support one or more compass applications). Environment sensors of communications device 102 may comprise, for example, temperature sensors, barometric pressure sensors, ambient light sensors, camera imagers, microphones, just to name few examples. Sensors of communications device 102 may generate analog or digital signals that may be stored in utilizing one or more memory locations internal to device 102 in support of one or more applications such as, for example, applications collecting or obtaining biometric attributes of a user (e.g., a subscriber) of communications device 102.

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
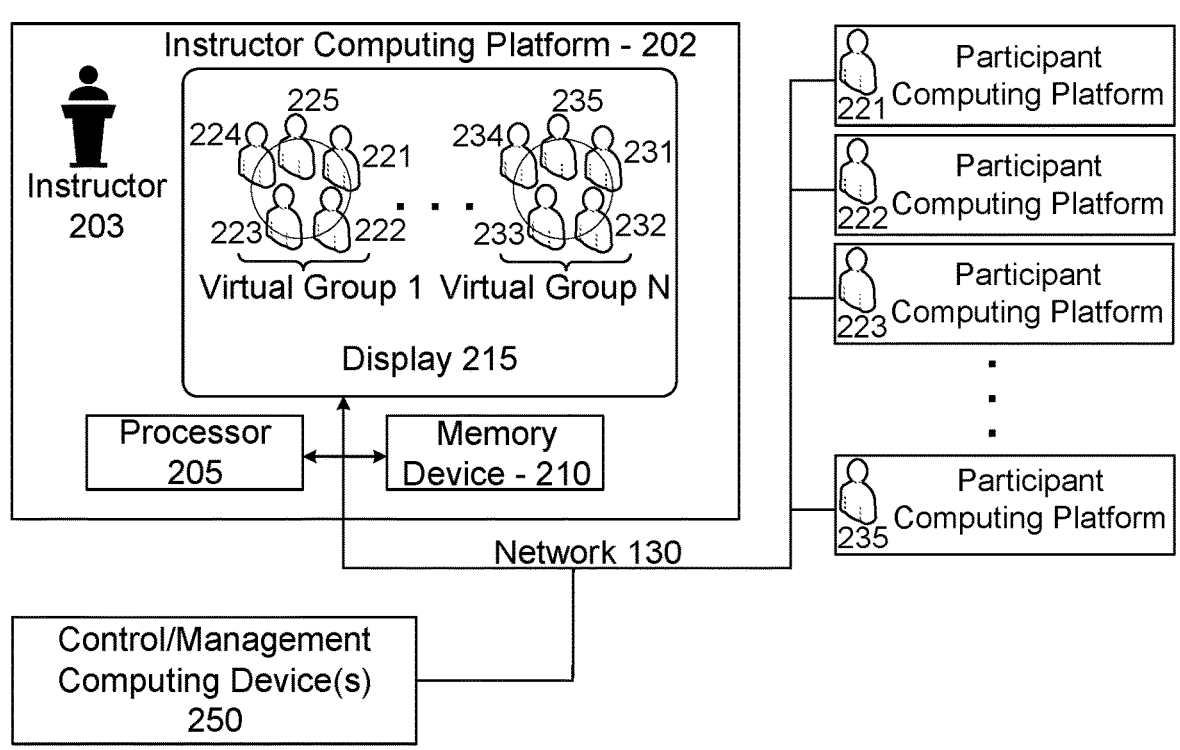
FIG. 2 is a diagram of an arrangement of a system for online content delivery, according to an embodiment.

In view of the communications infrastructure shown and described in reference to FIG. 1, more particular embodiments are directed toward online content delivery, such as between an instructor computing platform, one or more control/management computing devices, and a plurality of participant computing platforms. Thus, FIG. 2 is a diagram of an arrangement of a system for online content delivery, according to an embodiment 200. In the embodiment of FIG. 2, an instructor operating instructor computing platform 202 may be positioned at a remote location, such as in another city, another state, or another country, with respect to one or more of participant computing platforms 221, 222, 223, 224, 225, 231, 232, 233, 234, and 235. Instructor computing platform 202 may represent a source of content, such as content prepared by instructor 203, which may include notes, papers or electronic reading materials, technical articles, slide presentations, video segments, etc., and claimed subject matter is not limited to particular content types. In embodiment 200, control/management computing device 250 (which may be embodied in one or more computing devices) may operate as a content repository, may operate to control audio and/or video streaming to individual participants, as well as implement business logic functions for the online content delivery system of embodiment 200.

In embodiment 200, participants operating computer platforms 221, 222, 223, 224, and 225 are subdivided into virtual group 1, and participants 231, 232, 233, 234, and 235 are subdivided into virtual group N. It should be noted that although two virtual groups are displayed via display 215, in particular embodiments, any number of virtual groups, such as fewer than two virtual groups or greater than three virtual groups, may be displayed via display 215. Accordingly, claimed subject matter is intended to embrace one virtual group, three virtual groups, four virtual groups, five virtual groups, 10 virtual groups, 20 virtual groups, or any other number of virtual groups, nearly without limitation. Virtual groups may comprise a minimum number of participants, such as two participants, three participants, etc., and/or may comprise a maximum number of participants, such as five participants, six participants, 10 participants, or any other number of participants. Audio and/or visual content provided by, or under the control of, instructor 203 may be streamed to any or all of the participants of virtual group 1 and virtual group N. In one scenario, instructor 203 may represent an instructor in an educational setting responsible for providing online curriculum to the participants of virtual group 1 and virtual group N via network 130. Virtual groups 1, . . . , N may be formed in response to participants selecting a group according to their own preferences, or may be assigned by instructor 203, and/or according to other criteria. Criteria may include maximizing diversity within a virtual group, ensuring that one or more virtual groups comprises at least one subject matter expert, ensuring that certain participants who may need, for example, remedial assistance or tutoring are assigned to a group that can provide such remediation, and so forth. In addition, virtual groups may be formed by randomly assigning participants to a virtual group. Alternatively, or in addition, participants of a virtual group may rotate at regular or irregular intervals, for example.

As described further hereinbelow, processor 205 of instructor computing platform 202 may be coupled to at least one memory device, as represented by memory device 210. Additional components of instructor computing platform 202 are not shown in FIG. 2. Control/management computing device 250 may perform various control functions which, at least in certain embodiments, bring about (among other things) authentication and virtual classroom management functions, which enable instructor 203 to concentrate and/or focus on content presentation. Instructor computing platform 202, as well as participant computing platforms 221, 222, 223, . . . , 235 may embody hardware and/or software similar to those of communications device 102, such as hardware and/or software to provide wireless/wireline connectivity functions as described in reference to FIG. 1.

Figures 3, 4:
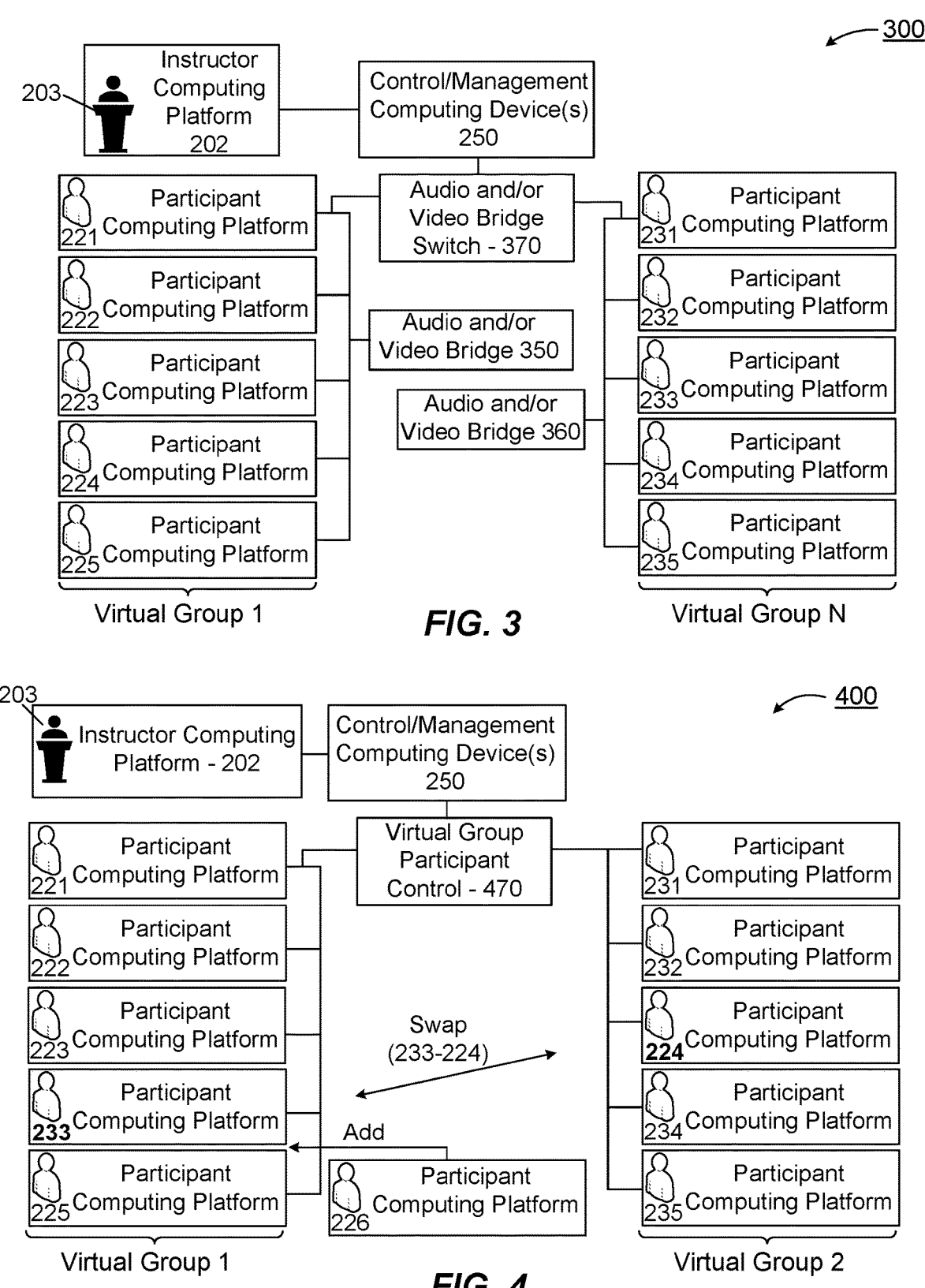
FIG. 3 is a diagram of an arrangement of a system for online content delivery in which an audio and/or video bridge permits content to be streamed between and/or among virtual groups, according to an embodiment.
FIG. 4 is a diagram of an arrangement of a system for online content delivery in which an instructor computing platform may exert control over the assignment of participants between and/or among virtual groups, according to an embodiment.

FIG. 3 is a diagram of an arrangement of a system for online content delivery in which an audio and/or video bridge permits content to be streamed between and/or among virtual groups, according to an embodiment 300. As shown in FIG. 3, participant computing platforms 221, 222, 223, 224, and 225 of virtual group 1 may utilize an audio and/or video bridge that permits audio and/or video streams generated by participants to be viewed exclusively by other participants of virtual group 1. Thus, while virtual group 1 collaborates, which may include verbal interactions, generating video segments, sharing prerecorded video segments, and so forth, such audio and/or video streams are not made available to participants 231, 232, 233, 234, and 235 of virtual group N. Accordingly, participants of virtual groups 1 and N may be capable of operating without being distracted by audio streams from other virtual groups. In embodiment 300, audio and/or video bridge 350 may operate to distribute audio and/or video streams generated by participants of virtual group 1, while audio and/or video bridge 360 may operate to distribute audio and/or video streams generated by participants of virtual group N In particular embodiments, instructor 203 may wish to monitor audio and/or video streams generated by members of a particular virtual group. Accordingly, instructor 203 may exercise control over audio and/or video bridge switch 370. Audio and/or video bridge switch 370 may operate to permit an audio or video stream generated by, for example, participants of virtual group 1 to be monitored by instructor 203. Thus, instructor 203 may, perhaps unbeknownst to participants of virtual group 1, monitor the activities of participants of virtual group 1, without interfering with discussions, for example, between or among participants of virtual group 1. Similarly, instructor 203 may utilize audio and/or video bridge switch 370 to monitor the activities of virtual group N, again, perhaps unbeknownst to participants of virtual group N. Further, perhaps in response to determining, for example, that audio discussions and/or video streams generated by participants of virtual group 1 may be of benefit to participants of virtual group N, instructor 203, cooperating with one or more control/management computing devices, may make available an audio and/or video stream from virtual group 1 to participants of virtual group N.

FIG. 4 is a diagram of an arrangement of a system for online content delivery in which an operating an instructor computing platform may exert control over the assignment of participants between and/or among virtual groups, according to an embodiment 400. In embodiment 400, instructor 203 may determine that participant 224, formerly a participant of virtual group 1, should be swapped with participant 233, formerly of virtual group N. In addition to exchanging participants of first and second virtual groups, instructor 203 may add new members to a virtual group (e.g. participant 226), remove members from a virtual group, dissolve a virtual group, create a new virtual group, or perform any other manipulations concerning membership in one or more virtual groups, and claimed subject matter is not limited in this respect. Instructor 203, cooperating with one or more control/management computing devices 250, may exert control over participants comprising virtual groups 1 and N utilizing virtual group participant control 470.

Figure 5:
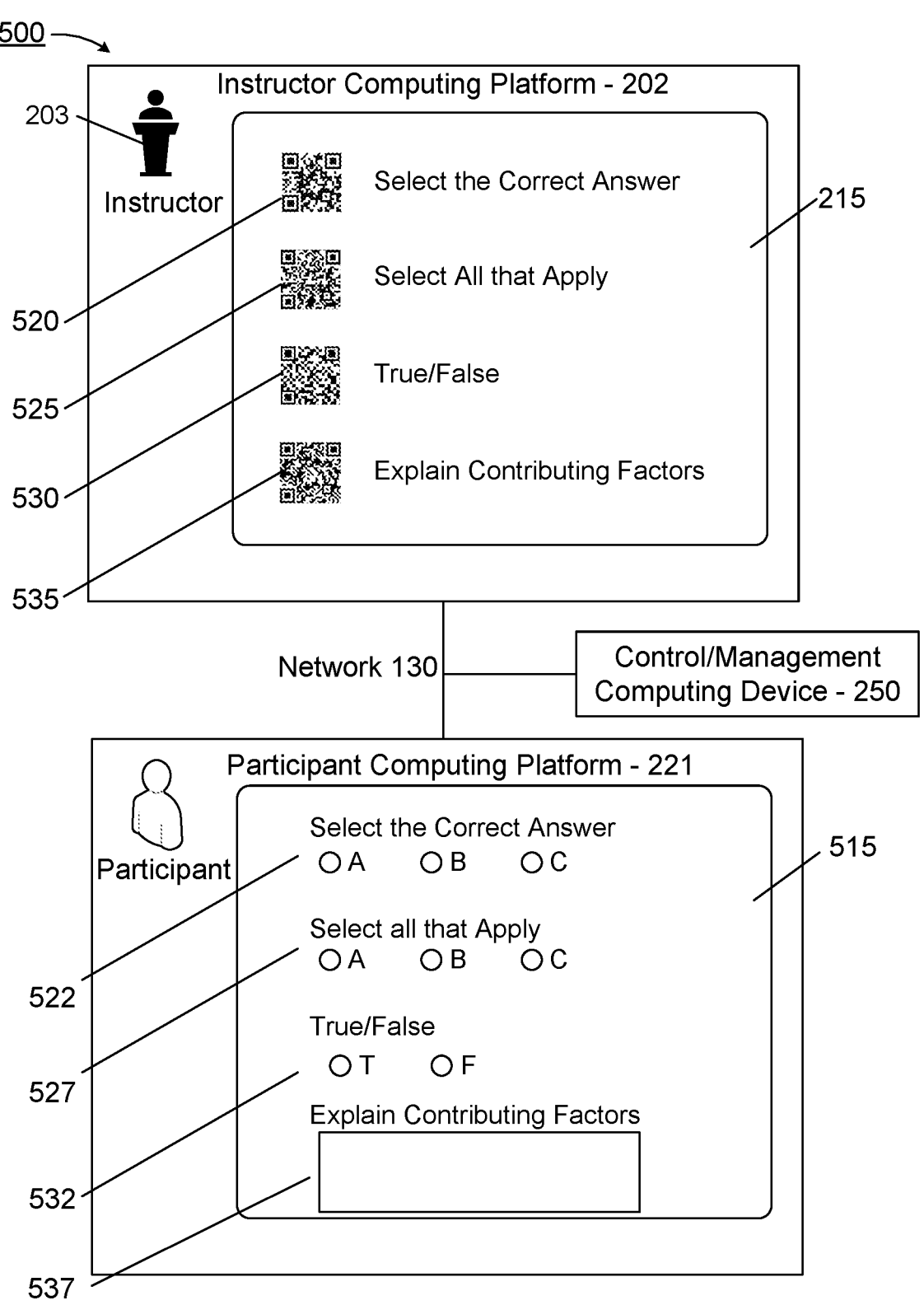
FIG. 5 is a diagram showing graphical user interface components of an instructor computing platform and participating computing platforms in a system for online content delivery, according to an embodiment.

FIG. 5 is a diagram showing graphical user interface components of an instructor computing platform and a participating computing platform in a system for online content delivery, according to an embodiment 500. In embodiment 500, one or more control/management computing devices 250, which may include a computer processor coupled to at least one memory device, may operate to monitor images and/or other content displayed via display 215. In the embodiment of FIG. 5, control/management computing device 250 generally operates to permit graphical components arranged on display 215 to be rendered similarly (or even identically) on, for example, display 515 of participant computing platform 221. Thus, in at least some instances, text, imagery, video segments, etc., which are displayed via display 215 may be identically rendered via display 515. It should be noted, however, that in particular embodiments, display 515 may represent two or more display devices. Accordingly, certain content, such as lecture notes provided by a control/management computing device may be displayed on a laptop coupled to a display while other content, such as chat areas, polling questions (e.g., implemented via radio buttons) may be displayed utilizing, for example, a participant's mobile communications device 102. In some instances, one or more groups of participants may view presented content using a single display device (e.g., a television set or an Internet-connected display) while each participant interacts utilizing their (individual) mobile communications device 102.

However, as shown in FIG. 5, display 215 may, at times, display machine-readable codes, such as machine-readable codes 520, 525, 530, and/or 535 (e.g., quick response or "QR" codes). Responsive to control/management computing device 250 recognizing a presence of one or more machine-readable codes, control/management computing device 250 may be directed to perform one or more particular functions. For example, in the embodiment of FIG. 5, responsive to control/management computing device 250 recognizing machine-readable code 520, computing device 250 may alter displayed content in accordance with one or more non-transitory computer-executable instructions. Thus, for example, as shown in FIG. 5, machine-readable code 520 may direct participant computing platform 221 to display three radio buttons 522, respectively adjacent to "A," "B," and "C" displayed via display 515. In addition, machine-readable code 520 may direct control/management computing device 250 to obtain output signals representing a single selection of radio button "A," "B," or "C" from participant computing platform 221. Further, responsive to obtaining output signals representing selection of radio buttons, control/management computing device 250 may aggregate output signals from additional participant computing platforms, such as all computing platforms of virtual group 1 and virtual group N. Responsive to a presence of machine-readable code 520, control/management computing device 250 may collate various selections of radio buttons by participants, perform statistical analyses on such selections (e.g., percentage of participants who answered "A," "B," or "C"), or perform any other type of analysis on selections made by virtual group participants.

In the embodiment of FIG. 5, responsive to control/management computing device 250 recognizing machine-readable code 525, computing device 250 may alter content displayed via display 515 in accordance with one or more other non-transitory computer-executable instructions. Thus, for example, as is also shown in FIG. 5, machine-readable code 525 may direct participant computing platform 221 to display radio buttons 527 along with selections "A," "B," and "C." In addition, machine-readable code 525 may direct control/management computing device 250 to obtain output signals representing one or more selections of a radio button from participant computing platform 221. Responsive to obtaining output signals representing selection of one or more radio buttons from computing platform 221, control/management computing device 250 may aggregate output signals from additional computing platforms. Additionally in response to detection of machine-readable code 525, control/management computing device 250 may collate output signals representing various selections of radio buttons by participants, perform statistical analyses on such selections (e.g., percentage of participants who answered "A," "B," or "C"), or perform any other type of analysis on selections made by virtual group participants.

Additionally, machine-readable code 530 may direct a participant computing device to display radio buttons 532 corresponding to a "true" (T) selection or a "false" (F) selection from participant computing platform 221. Alternatively, a participant computing device may be directed to display a checkbox, for example, which may permit participants to indicate whether, for example, the participants agree/disagree with a statement. Further, machine-readable code 535 may direct participant computing device 221 to display text-entry field 537, within which a participant operating participant computing platform 221 may enter a text string. In these instances, control/management computing device 250 may operate to aggregate signals representing, for example, "true" and "false" answers and compiling text strings entered by participants. Similar to detection of the presence of machine-readable codes 520 and 525, detection of machine-readable codes 530 and 535 may give rise to control/management computing device 250 performing certain actions such as collating of received participant selections, statistical analysis of received participant selections, and so forth, and claimed subject matter is not limited in this respect.

Figure 6A:
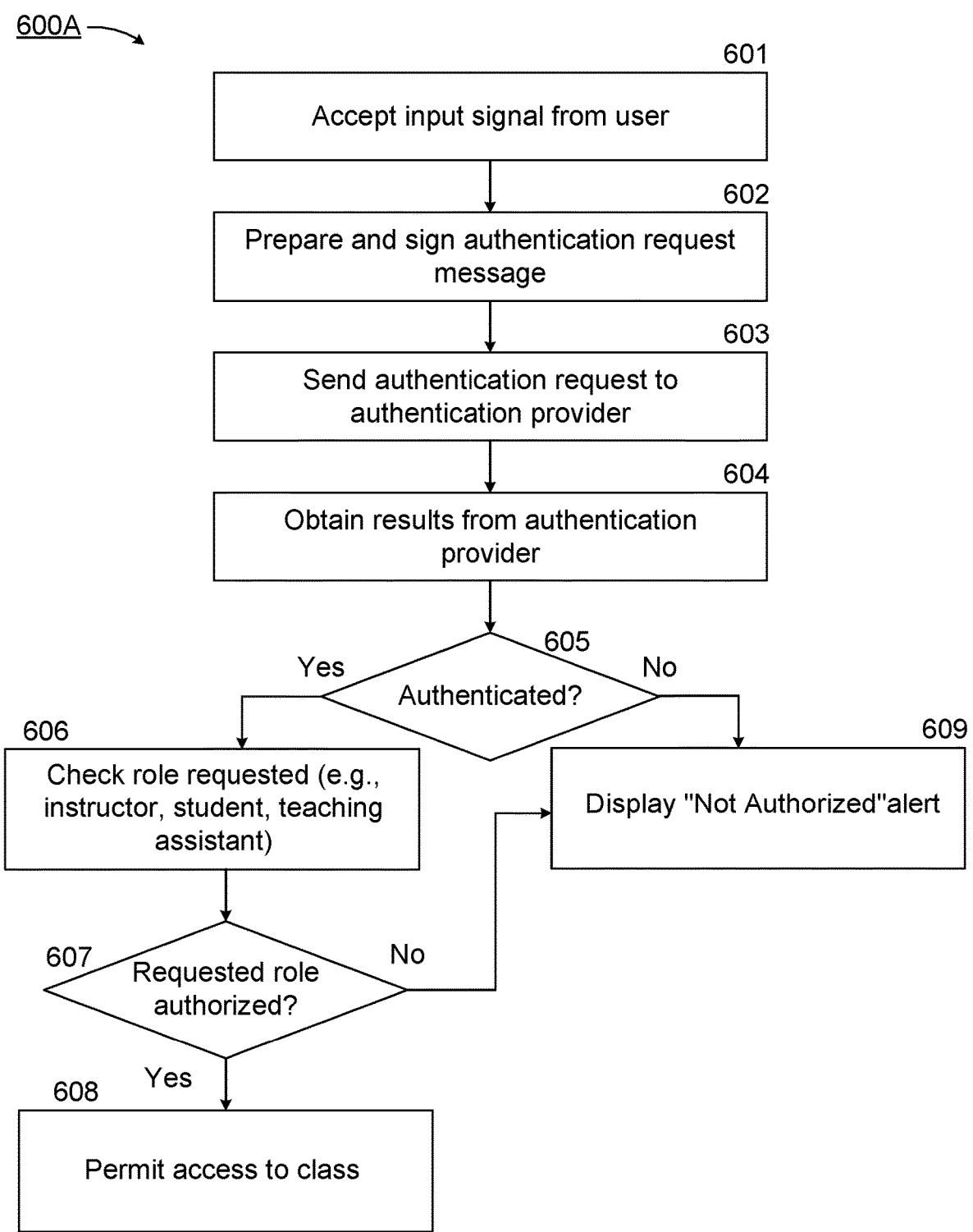
FIG. 6A is a flowchart for a participant login process in a system for online content delivery, according to an embodiment.

FIG. 6A is a flowchart for a participant login process in a system for online content delivery, according to an embodiment 600A. It should be noted that the disclosed embodiments, such as the embodiments of FIGS. 6A-6L, are intended to embrace numerous variations, including processes that may include actions in addition to those depicted in the figures, actions performed in an order different than those depicted in the figures, as well as processes that include fewer steps than those depicted. The processes of FIGS. 6A-6L may be performed utilizing the arrangements of hardware and software entities described in reference to FIGS. 1-5, although claim subject matter is intended to embrace processes utilizing arrangements of hardware and/or software different than those described in reference to FIGS. 1-5. The process of FIG. 6A may be performed by, for example, a control/management computing device cooperating with an authentication provider, perhaps remotely located (e.g., in the cloud) from a participant computing platform and an instructor computing platform. The process of FIG. 6A begins at 601, at which, in response to receiving an identifier (e.g., an email address) from a computing platform of a potential participant, a control/management computing device may acquire and/or accept the input signal. At 602, the control/management computing device may prepare and sign (such as digitally sign to indicate a credential) a request to access online content. At 603, the control/management computing device may transmit the signed request to an authenticating entity. In the embodiment of FIG. 6A, use of an authenticating entity, which may be potentially separate from an instructor computing platform, may provide more expedient authentication than authentication provided by another entity, such as an instructor operating an instructor computing platform.

The process of FIG. 6A may continue at 604, at which a control/management computing device may obtain authentication results from an appropriate authentication provider. At 605, dependent upon a number of factors, such as whether the role requested by the potential participant (e.g., an instructor, a co-instructor, a student participant, a teaching assistant, etc.) represents a valid role in the online content delivery environment, an authentication provider may return an indication of the authentication status of the potential participant. Responsive to a signal from an authentication provider indicating that a particular participant has been authenticated, a control/management computing device, for example, may determine if particular class-specific rules permit, for example, teaching assistants, co-instructors, and so forth, at block 606. In response to an authentication provider indicating that a requested role is authorized for a particular online content delivery environment, a control/management computing device may admit the potential participant, teaching assistant, co-instructor to the online content delivery environment.

Returning briefly to 605, responsive to an authentication provider returning a signal indicating that a potential participant is not authorized, the process of FIG. 6A may terminate at 609, at which a control/management computing device may post an alert to the potential participant indicating that the potential participant is not authorized for this particular online content delivery environment. A control/management computing device may bring about display of a similar alert responsive to 607, at which it may be determined that a particular requested role of the potential participant (e.g., an instructor, a co-instructor, a teaching assistant, a participant, etc.) does not conform or record with particular rules set forth for a particular online content delivery environment.

FIG. 6B is a flowchart for a participant entry process in a system for online content delivery, according to an embodiment 600B. The process of FIG. 6B may be performed by, for example, a computing platform of a potential participant or may be performed by an instructor, a co-instructor, a teaching assistant, or by any other party attempting to gain admission to an online content delivery setting. The process of FIG. 6B may begin at 610, which may include accepting input signals via, for example, a participant computing platform attempting to initiate an entry process. Thus, 610 may be performed in response to a potential participant interacting with a mouse or keyboard or other user interface device. At 611, perhaps in response to a control/management computing device permitting access (e.g., 608 of FIG. 6A), the control/management computing device may transmit one or more single-use tokens to the potential participant. In particular embodiments, the use of single-use tokens may operate to identify a participant to a control/management computing device, thereby preventing unauthorized participants, for example, from uploading and/or distributing audio and/or video segments. At 612, a participant computing platform may acquire signals from one or more imaging devices (e.g., cameras) and/or one or more audio input devices (e.g., microphones) for upload or publishing to an instructor computing platform, for example. At 613, a participant computing device may obtain identification parameters of a virtual group to be joined by the participant. As described previously herein, a participant may join a virtual group responsive to random assignment to a virtual group, an instructor selecting to place a participant within a particular virtual group, or responsive to any other process for placing a participant within a virtual group. At 614, the participant computing platform may receive identification parameters of a selected virtual group and, at 615, the participant may join the virtual group.

FIG. 6C is a flowchart for a process in which a participant enters a virtual group in a system for online content delivery, according to an embodiment 600C. The process of FIG. 6C may be performed by, for example, a computing platform of a participant attempting to gain access (e.g., join) a virtual group. The process may begin at 620, which includes verifying that a participant computing platform is permitted to gain access to a virtual group. At 621, responsive to a particular participant computing platform being determined as not being authorized or otherwise permitted to join a virtual group, an alert may be posted to indicate that the participant is not authorized, at 622. Conversely, responsive to a participant computing platform being admitted to a virtual group, 623 may be performed, which includes requesting a listing of identifiers of participants assigned to a virtual group. At 624, a participant computing platform may obtain identifiers requested at 623, and, at 625 the participant computing platform may obtain one or more single-use tokens to subscribe to audio and/or video streams generated by participants in the virtual group. At 626, the participant computing platform may subscribe to audio and/or video streams from participants and, responsive to receipt of audio and/or video streams, display and/or annunciate audio and/or video streams on the participant computing display. The process may continue at 627, wherein the participant computing device maintains periodic communication with a control/management computing device so as to obtain notifications responsive to changes in participants of the virtual group.

In particular embodiments, responsive to a participant joining a selected virtual group and/or responsive to a participant joining a content delivery session (e.g., a lecture, a training workshop, etc.) one or more control/management computing devices may allocate memory and or computing resources to serve as a notebook or scratchpad for use by the participant. For example, a control/management computing device may permit a participant to store relevant text-based notes or other types of annotations regarding a particular event of an online content delivery session. Such notes may be stored along with, for example, a snapshot or other type of image of a presented slide or video segment. In an embodiment, a participant computing platform may automatically (e.g., without participant input) record or capture displayed imagery in response to a new slide or video segment being presented, along with any text or annotations that the participant may determine is relevant to the content of the new slide or video segment.

FIG. 6D is a flowchart for a process in which a virtual group may be rearranged in a system for online content delivery, according to an embodiment 600D. The process of FIG. 6D may be performed by, for example, a control/management computing device, such as during an online content delivery session. The process may begin at 630, which may include acquiring or obtaining a signal, such as from an instructor or co-instructor, to indicate an upper threshold number of participants allowed in a virtual group. At 631, a control/management computing device may compute a number of virtual groups utilized for a given number of participants in an online content delivery session. At 632, the control/management computing device may randomly assign participants to virtual groups and may, perhaps, ensure that a number of participants in a virtual group does not differ from the number of participants in any other virtual group by more than a predetermined amount such as, for example, one participant. It should be noted that although the embodiment of 600D suggests random assignment of participants to virtual groups, assignments may be made by an instructor or co-instructor, by individual participants choosing to select a particular group, by ensuring that at least one subject matter expert is selected for a virtual group, or by one or more rules that increase or maximize diversity among virtual groups. Assignments of participants to virtual groups may be made according to other criteria, and claimed subject matter is not limited in this respect. At 633, a control/management computing device may inform participants of respective virtual group assignments and, at 634, the computing device may obtain signals from participant computing devices indicating acceptance of participant virtual group assignments. In particular embodiments, following 633, one or more actions of process 600C may be performed, such as by participant computing platforms in response to acceptance of a participant by a virtual group.

Figure 6E:
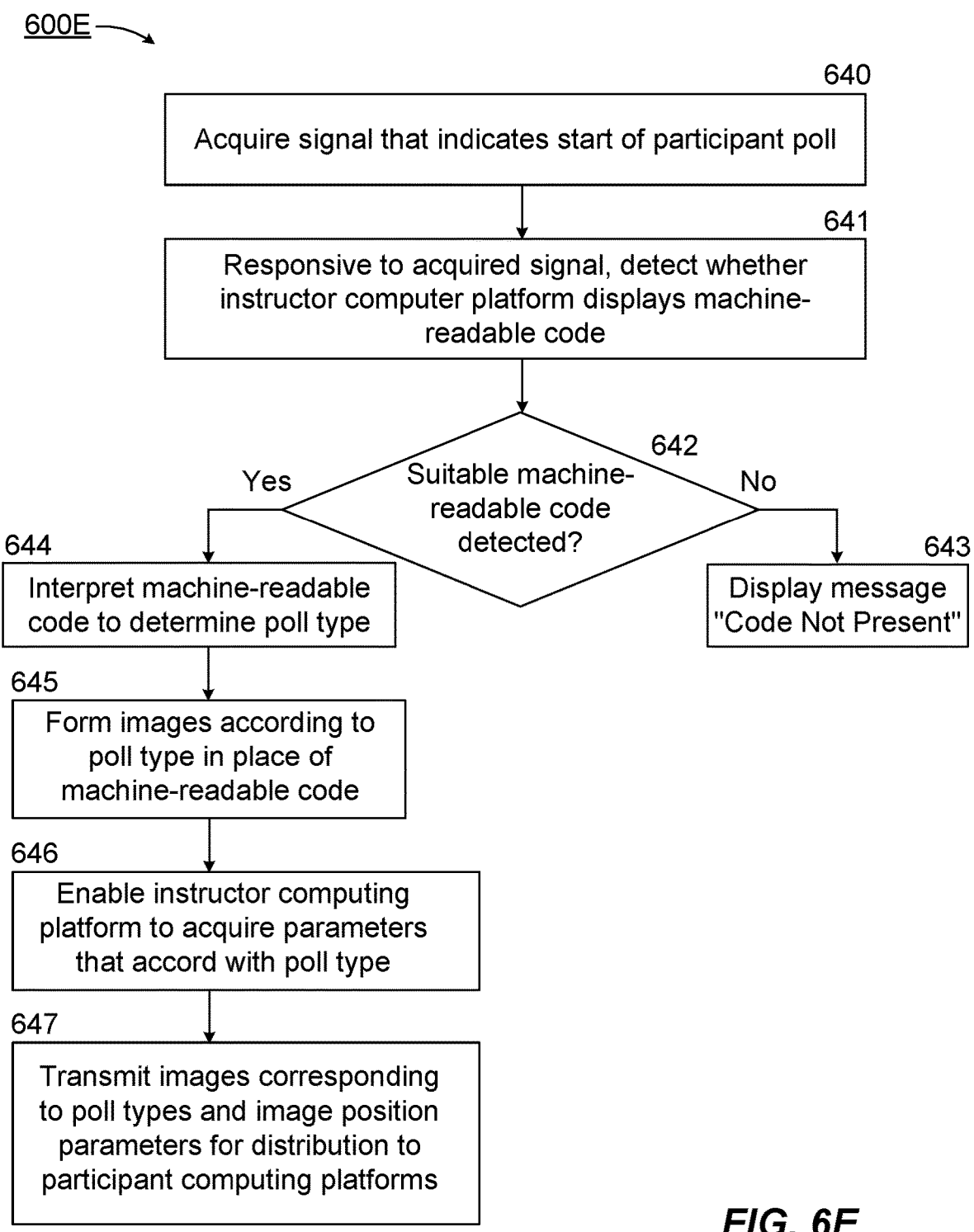
FIG. 6E is a flowchart for a process of virtual group polling, from the perspective of an instructor computing platform in a system for online content delivery, according to an embodiment.

FIG. 6E is a flowchart for a process of virtual group polling, from the perspective of an instructor computing platform, in a system for online content delivery, according to an embodiment 600E. The process of FIG. 6E may be performed by, for example, the instructor computing platform perhaps during an online content delivery session. The process of FIG. 6E may begin at 640, which includes an instructor computing platform receiving a signal, such as a signal transmitted by a control/management computing device, to indicate initiation of a participant poll. For example, in response to an instructor (e.g., instructor 203 of FIG. 5) setting forth a query to participants to select radio button "A," "B," or "C," a control/management computing device may transmit a signal to the instructor computing platform. The signal may indicate that hardware and software resources of the computing device are available to receive and aggregate query responses from participants and, perhaps, to perform statistical analysis on query responses. At 641, a control/management computing device may detect a machine-readable code by way of analyzing imagery presented on a display device of an instructor computing platform. At 642, responsive to machine-readable codes not being present on a display device of an instructor computing platform, 643 may be performed in which a message indicating that the code is not present may be displayed to the instructor.

At 644, responsive to detection of suitable machine-readable code, 644 may be performed, which may include interpreting the machine-readable code to determine a poll type (e.g., select a correct answer, select all answers that apply, select true/false, enter text into a text-entry field, etc.) as described in reference to FIG. 5. At 645, responsive to determination of a poll type, a control/management computing device may replace machine-readable codes (e.g., QR codes) with images in accordance with the selected poll type. At 646, a control/management computing device may, for example, form selectable (e.g., clickable) radio buttons for display utilizing display devices of participant computing devices. At 647, a control/management computing device may transmit images corresponding to poll types and image position parameters for distribution among participant computing platforms.

FIG. 6F is a flowchart for a process of virtual group polling, from the perspective of a participant computing platform, in a system for online content delivery, according to an embodiment 650. The process of FIG. 6F may be performed by, for example, the participant computing platform in response to publishing of a poll set forth by an instructor computing platform cooperating with a control/management computing device. The process of FIG. 6F may begin at 650, in which a participant computing platform receives a signal indicating the start of a participant poll. At 651, a participant computing platform may extract image parameters, user input control parameters, legends, and so forth, to be displayed on a display device of the participant computing platform. At 652, the participant computing platform may build an appropriate polling screen, so as to display, for example, one or more elements depicted in display 515 of FIG. 5. 653 may include the participant computing platform facilitating user interface actions to be performed in accordance with the displayed one or more user interface controls. At 654, responsive to acquiring a signal from a user interface control affected or influenced by a user input, the participant computing device may indicate that a particular control was selected (e.g., selection of a radio button). 654 may also include transmitting the status of a particular selection, or other type of user input, to a control/management computing device for aggregation, statistical analysis, and so forth, and claimed subject matter is not limited in this respect.

In particular embodiments, following formation of a virtual group, such as described in reference to FIG. 6C through 6F, and following live polling of participants, a virtual group may initiate synchronous playback of at least a portion of a prerecorded lecture, training session, etc. In other embodiments, a virtual group may form for the purposes of viewing and/or interacting with other virtual group participants during playback of one or more entire lectures, training sessions, etc. In some embodiments, a display device of a participant computing device may allocate particular display regions for playback, viewing participant reactions to playback, as well as any interactive polling screens presented during playback. Accordingly, participants may be capable of synchronous viewing of prerecorded content, in which participants of a virtual group view scenes of a video segment at the same time, as well as being able to view other group members' facial expressions expressed at particular moments during video segment playback. Further, any polling, quizzes, queries, or any other interactions that occurred during previous, live presentation of the video segment, may be presented to the participants during prerecorded playback, thereby giving participants viewing prerecorded content an experience that is identical to the experience presented to participants during live presentation of content. Further, any polling results, quizzes, short answer queries involving participants entering characters into a text-entry field, may be stored along with similar results from other participants acquired during live presentation of content. Thus, participants who may have been absent during a live presentation of content may attend make-up sessions, involving prerecorded content, that provide an experience identical to participant interactions that occurred during live content delivery sessions.

FIG. 6G is a flowchart for a process of acknowledging a participant who may wish to raise their hand, from the perspective of a participant computing platform, in a system for online content delivery, according to an embodiment 600G. The process may begin at 660, which may include a participant computing platform acquiring a signal to indicate that the participant would like to raise their hand, such as to ask a question, make a comment, or provide any other feedback, for example, to an instructor. The process may continue at 661, wherein the participant computing platform transmits an indicator to an instructor computing platform. At 662, responsive to receipt of an approval message from an instructor computing platform, for example, the participant computing platform may indicate that the participant can begin annunciating. Alternatively, or in addition to, the participant computing platform may indicate expiration of a timeout counter, wherein upon such expiration, the participant may begin annunciating. Alternatively, or in addition to, the participant computing platform may indicate that a lower threshold percentage of participants (e.g., 50%, 60%, 70%, or more or less) have subscribed to an audio stream from the participant computing platform. The process may be completed at 663, which may include acquiring a signal, such as from a user interface, to indicate that the participant would like to lower their hand, thus at least temporarily suspending an audio stream generated by the participant computing platform.

FIG. 6H is a flowchart for a process of acknowledging a participant to raise their hand, from the perspective of an instructor computing platform, in a system for online content delivery, according to an embodiment 600H. The process may begin at 670, which may include an instructor computing platform acquiring a signal to indicate that a participant would like to raise their hand. At 671, the instructor computing platform may determine, in accordance with one or more policies, whether to permit the participant to raise their hand. For example, in particular instances a policy may forbid a participant from raising their hand during a presentation from a participant of a different virtual group. In another example, a policy may forbid a participant from raising their hand on more than a particular number of occasions. In another example, a policy may forbid a participant from raising their hand if other participants have already indicated a desire to raise their hands. A policy may forbid a participant from raising their hand at other times during an online content delivery session, and claimed subject matter is not limited in this respect.

At 672, responsive to an instructor computing platform permitting the participant to raise their hand, the instructor computing platform may transmit an indication to some or all other participants. The indication may inform the (other) participants that a participant has raised their hand and that the (other) participants should subscribe to audio and/or video streams from that participant. Alternatively, or in addition to, an instructor computing platform may delay any such indication until expiration of a timer, or until acknowledgments are received from a threshold (e.g., a lower threshold) percentage of participants to indicate that the participants have received notification and have subscribed to an audio and/or video feed from the participant. At 673, the instructor computing platform may transmit a message to the participant to indicate approval of the request to raise their hand. At 674, an audio and/or video stream generated by the participant may be displayed at a particular location of a display device of the instructor computing platform. In some embodiments, a video stream generated by a participant having their hand raised may be displayed in a special (e.g., "podium") region of a display device of an instructor computing platform.

It may be appreciated that a measure of participant engagement in a content delivery session (e.g., a lecture, a training workshop, etc.) may be derived from the activities described in FIGS. 6G and 6H. For example, a participant who remains curious and attentive during a content delivery session may meaningfully interact with user interface components of a participant computing platform, which may include promptly answering poll questions, completing text-entry fields when prompted to do so, raising their hand responsive to instructor queries, preparing and transmitting chat messages, and so forth. Such meaningful interactions with interface devices of a participant computing platform, such as mouse clicks, keyboard activity, etc., may be aggregated and/or tracked by one or more control/management computing devices. In particular embodiments, a record of meaningful interactions with interface devices of a participant computing platform may be compared with a record of interactions of other participant computing platforms, thus permitting a means of evaluating and/or comparing engagement of some or all participants.

In particular embodiments, in response to a participant raising their hand and providing, for example, a timely or insightful question or comment, an instructor operating an instructor computing platform may wish to provide a favorable indication of the participant. Thus, in an embodiment, an instructor may be capable of selecting an icon, name, or other representation of the participant and may enter an indication of favorability (such as a "thumbs up" indicator, or a grade-related indicator, such as an "A"), which may record the instructor's favorability rating. In some instances, an instructor computing platform may provide a menu permitting an instructor to choose a grade or other type of rating with respect to a given participant. Such grades or other type of favorability rating may be stored utilizing one or more configuration/management computing devices. Accordingly, an instructor may quickly and effortlessly assign a favorability rating of a participant for later use, such as while preparing progress reports, term grades, etc.

FIG. 6J is a flowchart for a process of permitting a participant to move from first virtual group to a second virtual group, from the perspective of a participant computing platform, in a system for online content delivery, according to an embodiment 680J. The process may begin at 680, which may include acquiring a signal from a user interface of a participant computing platform, wherein the signal indicates that a participant would like to move from a first virtual group to a second virtual group. Responsive to receipt of the signal from a user interface, the process may continue at 681, which may include the participant computing platform transmitting an indication to a control/management computing device. At 682, the control/management computing device may approve/deny the move request. Responsive to approval of a request to move from a first virtual group to a second virtual group, the process of FIG. 6C may be performed (684), in which a participant joins a selected virtual group. Responsive to denial of a request to move from of first virtual group to a second virtual group, 683 may be performed, which may bring about display of a "Virtual Group Full" message, for example. Denial of a participant moving from a first virtual group to a second virtual group may occur for other reasons, and claimed subject matter is not limited in this respect.

Figure 6K:
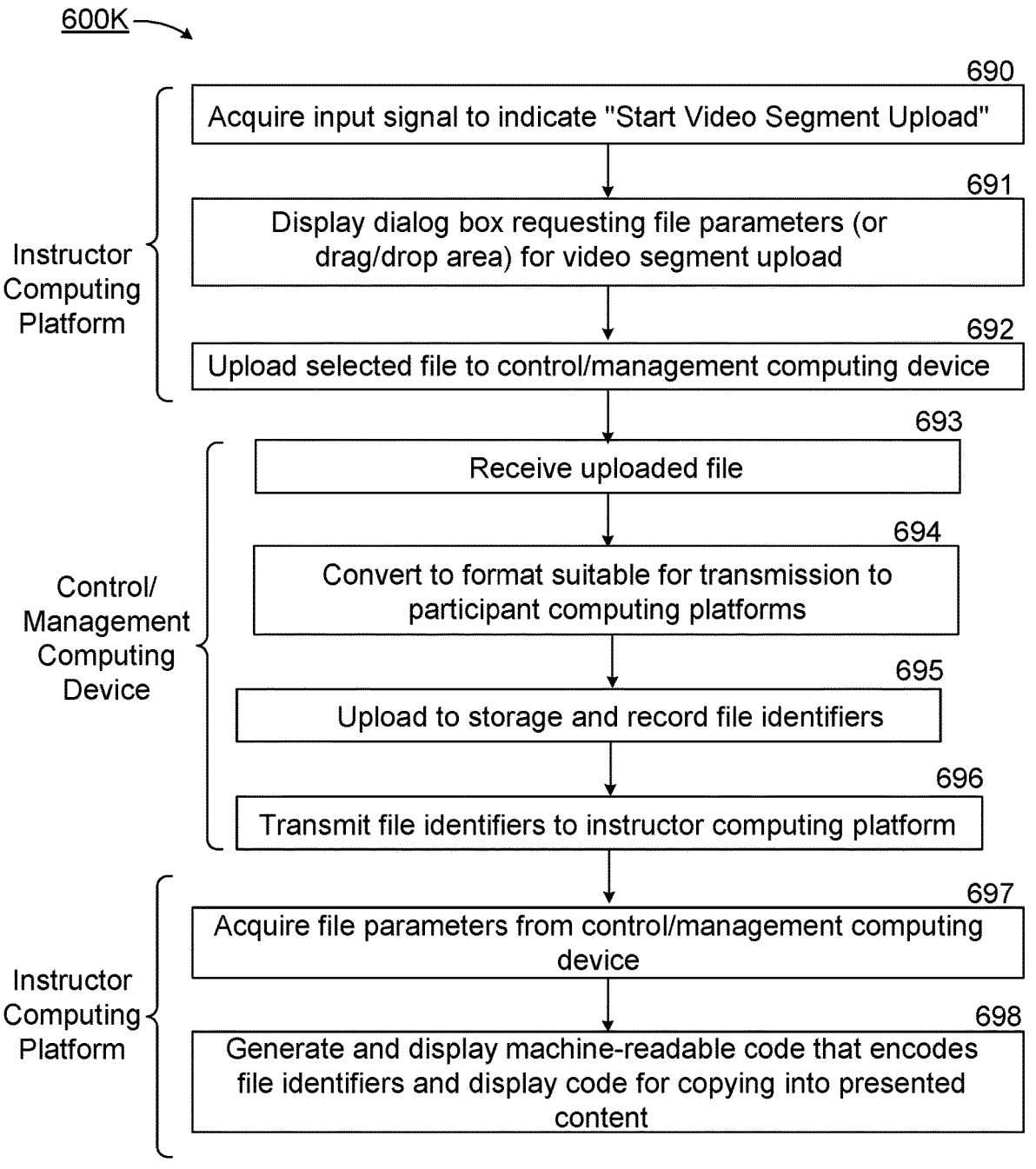
FIG. 6K is a flowchart for a process of permitting a participant to move from a first virtual group to a second virtual group, from the perspective of a participant computing platform in a system for online content delivery, according to an embodiment.

FIG. 6K is a flowchart for a process of permitting a participant to move from a first virtual group to a second virtual group, from the perspective of a participant computing platform in a system for online content delivery, according to an embodiment 600K. The process of embodiment 600K may begin at 690, which may include acquiring a signal, such as at an instructor computing platform, to indicate the start or initiation of a video segment upload. The process may continue at 691, which may include displaying a dialog box or other type of notification requesting file parameters of a video segment for uploading. Alternatively, or in addition to, 691 may include displaying an area on a display of an instructor computing platform within which an instructor may drag/drop an icon representing a video segment. At 692, and instructor computing platform may upload the file comprising the video segment to a control/management computing device.

At 693, responsive to receipt of an uploaded video segment (e.g., at 692) a control/management computing device may convert (e.g., at 694) the uploaded video segment to a format suitable for transmission to participant computing platforms. In particular embodiments, conversion into a suitable format may include down sampling, which may reduce channel bandwidth utilized to transmit the video segment from a control/management computing device to a participant computing device. It should be noted that a control/management computing device may perform a number of down sampling and/or rendering operations to accommodate various types of participant computing platforms, such as platforms having reduced-size displays (e.g., hand-held mobile communications devices), laptop computing screens having standard-sized displays, and high definition entertainment displays, such as 4K monitors, 8K monitors, 16K monitors, etc. The process may continue at 695, which may include uploading down sampled and/or rendered video segments for storage at a control/management computing device. At 696, the process may continue with transmitting file identifiers to an instructor computing platform.

The process of FIG. 6K may continue at 697, which may include an instructor computing platform acquiring file parameters (e.g., filename, directory, path, and so forth) from a control/management computing device and, at 698, generating and displaying machine-readable codes (e.g., QR codes) that encode the file identifiers. 698 may additionally include displaying the machine-readable codes (e.g., QR codes), which may influence or affect content presented to participants.

Figure 6L:
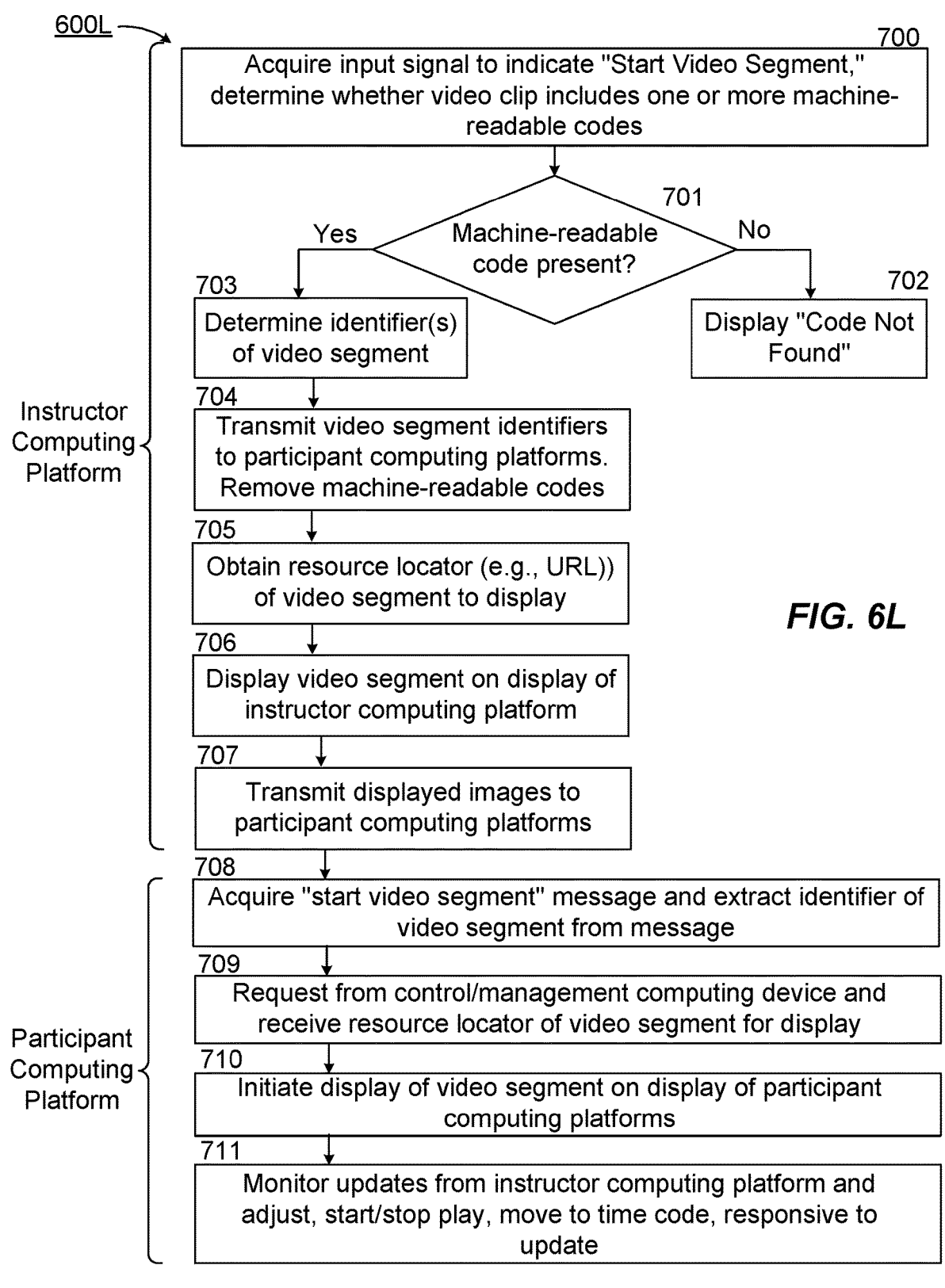
FIG. 6L is a flowchart for a process of uploading a video segment in a system for online content delivery, according to an embodiment.

FIG. 6L is a flowchart for a process of uploading a video segment in a system for online content delivery, according to an embodiment 600L. Certain portions of the process of FIG. 6L may be conducted at an instructor computing platform, while certain other portions of the process may be conducted at a participant computing platform. The process may begin at 700, which may include an instructor computing platform acquiring an input signal, such as from a user interface, to indicate that playback of a video segment should be initiated. Responsive to receipt of the input signal, the instructor computing platform may determine whether one or more machine-readable codes (e.g., QR codes) is presently displayed on a display device of the instructor computing platform. Responsive to failing to detect presence of a machine-readable code, 702 may be performed, in which an instructor computing platform may display content of the video segment responsive to the instructor (manually) specifying file parameters (e.g., filename, file path, and so forth) of the video segment for playback.

Responsive to 701 determining that a machine-readable code is present, an instructor computing platform may perform 703, which may include an instructor computing platform determining one or more identifiers of the video segment. At 704, video segment identifiers may be transmitted to participant computing platforms. Also at 704, an instructor computing platform may remove machine-readable codes so that these are not rendered utilizing display devices of participant computing platforms. At 705, an instructor computing platform may obtain resource locators (e.g., uniform resource locators) of a video segment for display. At 706, a video segment may be displayed on a display device of the instructor computing platform. 706 may additionally include periodically or occasionally detecting adequate volume and an advancing time code of the video segment to determine whether play of the video segment has been paused. 706 may additionally include encoding parameters of a video segment for transmission to participant computing platforms, such as at 707.

The process of embodiment 600L may continue at 708, which may include a participant computing platform acquiring a "start video segment" message and extracting identification parameters of the video segment. At 709, a participant computing device may query the control/management computing device for the resource locator (e.g., uniform resource locator) of the video segment to display. At 710, responsive to receipt of the resource locator of the file to display, the participant computing platform may begin displaying the video segment on the display device of the participant computing platform. At 711, the participant computing platform may monitor updates from the instructor computing platform as well as adjusting volume, starting/stopping play, moving to a particular time code, as indicated in any messages from the instructor computing platform.

In particular embodiments, prerecorded portions (e.g., video segments) of a content delivery session (e.g., a lecture) may be made available immediately following live delivery of online content. Accordingly, responsive to a participant's late arrival to a lecture or training session, for example, the participant may be capable of viewing a missed portion of the session while one or more control/management computing devices continues to record live online content. In particular embodiments, playback of a missed portion of a content delivery session may occur at an accelerated rate, such as 1.5 normal speed, for example, so as to permit a participant to quickly review missed material until reaching a point in time at which real-time content delivery begins. In particular embodiments, a control/management computing device may operate to remove inter-word and/or pauses, so as to permit the participant to quickly assimilate and/or absorb missed content while reaching real-time parity with other participants. In particular embodiments, a participant may choose to rewind a portion of a live session for a predetermined duration so that the participant can, for example, revisit a missed portion of a lecture. The participant may then be capable of accelerating playback, such as at a rate of 1.5 normal speed, for example, so as to permit the participant to catch up to a point in the live-broadcasted session.

Figure 6M:
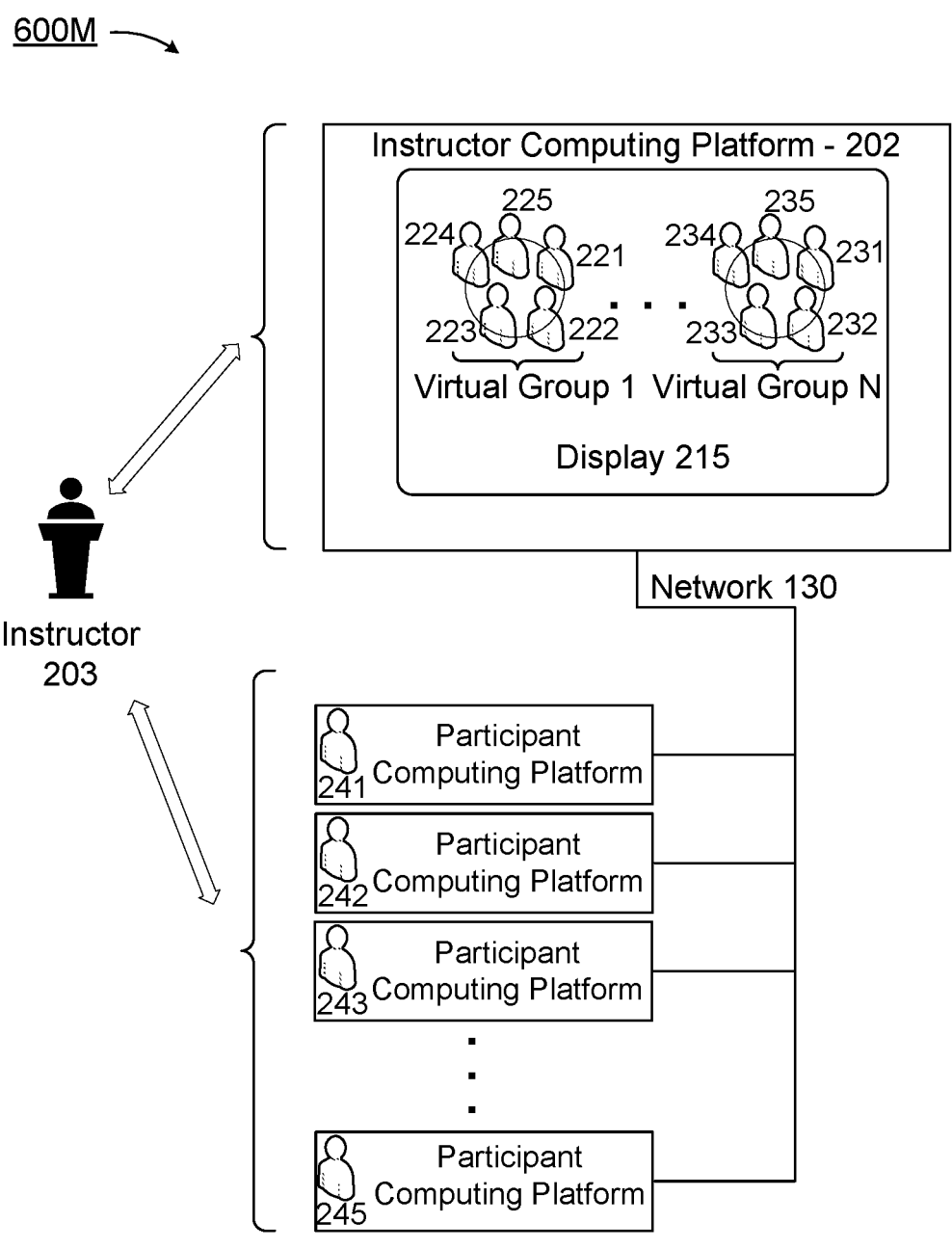
FIG. 6M is a diagram of an instructor operating an instructor computing platform for use in online content delivery to a hybrid audience comprising in-class participants and remotely-located participants, according to an embodiment.

FIG. 6M is a diagram of an instructor operating an instructor computing platform for use in online content delivery to a hybrid audience comprising in-class participants and remotely-located participants, according to an embodiment 600M. In FIG. 6M, instructor 203 may operate instructor computing platform 202, which may display representations of remotely-located participants (e.g., participants 221-225 and participants 231-235) as well as participants 241-245, who may be present in a lecture hall, classroom, laboratory, or any other location that is proximate with instructor 203. In such instances, it may be appreciated that although audio signals generated by an in-class participant, such as participant 241, may be easily perceived by other in-class participants (e.g., participants 242-245 co-located with participant 241) such audio may be difficult to perceive by remotely-located participants (e.g., participants 221-225). Accordingly, responsive to an in-class participant annunciating a question or comment, other audio signals currently streamed to in-class participants as well as to remotely-located participants may be muted. In particular embodiments, such audio muting may provide a relatively interference-free audio stream between the in-class participant and the remotely-located participants. Further, such audio muting may additionally operate to preclude the generation of potentially annoying feedback produced in response to an audio receiving device being exposed to audio from a live participant as well as audio from an audio reproduction device, such as a speaker. It should be noted that muting of an audio reproduction device may occur responsive to instructor 203 moderating an audio stream from a participant, wherein approval from instructor 203 precedes distribution of audio from a participant, or may occur responsive to instructor 203 automatically (e.g. in an unmoderated manner) facilitating distribution of audio from a participant.

Figure 7:
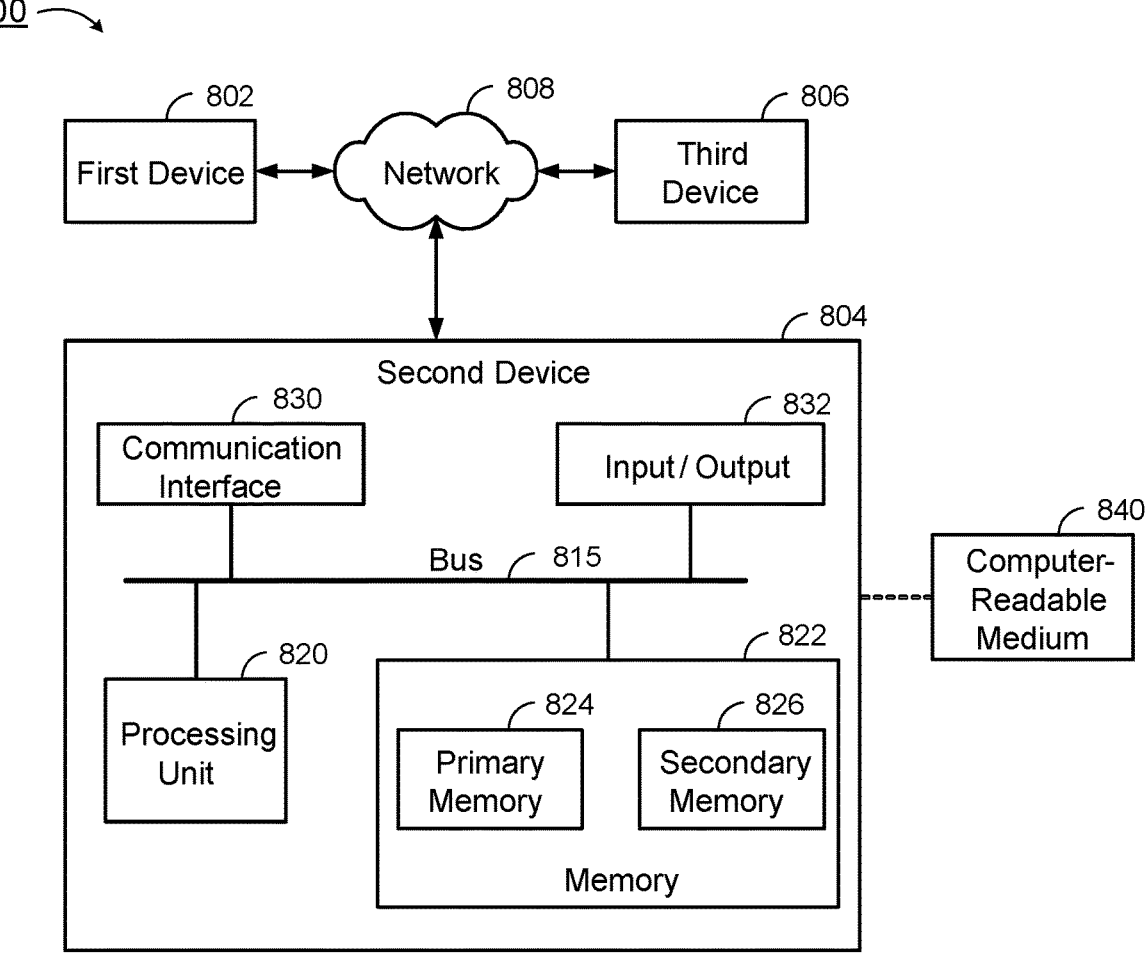
FIG. 7 is a diagram showing a computing environment in a system for online content delivery, according to an embodiment.

FIG. 7 is a diagram showing a computing environment, according to an embodiment 800. In the embodiment of FIG. 7, first and third devices 802 and 806 may be capable of rendering a graphical user interface (GUI) for a network device, such as server device 140 of FIG. 1, so that a subscriber utilizing a communications device (e.g., a mobile communications device) may engage in system use. Device 804 may potentially serve a similar function in this illustration. Likewise, in FIG. 7, computing device 802 ('first device' in FIG. 7) may interface with computing device 804 ('second device' in FIG. 7), which may, for example, also comprise features of a client computing device and/or a server computing device, in an embodiment that implements a client/server computing model. Processor (e.g., processing device) 820 and memory 822, which may comprise primary memory 824 and secondary memory 826, may communicate by way of a communication interface 830, for example. The term "computing device," in the context of the present patent application, refers to a system and/or a device, such as a computing apparatus, that includes a capability to process (e.g., perform computations) and/or store electronic digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 7, is merely one example, and claimed subject matter is not limited in scope to this particular example.

In FIG. 7, computing device 802 may provide one or more sources of executable computer instructions in the form of physical states and/or signals (e.g., stored in memory states), for example. Computing device 802 may communicate with computing device 804 by way of a network connection, such as via network 808, for example. As previously mentioned, a connection, while physical, may be virtual while not necessarily being tangible. Although computing device 804 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may comprise one or more articles utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a machine-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 820 may comprise one or more circuits, such as digital circuits, to perform at least a portion of a computing procedure and/or process. By way of example, but not limitation, processor 820 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates device 804 as including a component 832 operable with input/output devices, and communication bus 815, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communications devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client server device and/or a communications device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communications device and/or a client server device in
various embodiments. Network devices capable of operating
as a client server, may include, as examples, dedicated
rack-mounted servers, desktop computers, laptop comput-
ers, set top boxes, tablets, netbooks, smart phones, wearable
devices, integrated devices combining two or more features
of the foregoing devices, and/or the like, or any combination
thereof. As mentioned, signal packets and/or frames, for
example, may be exchanged, such as between a server
device and/or a communications device, as well as other
types of devices, including between wired and/or wireless
devices coupled via a wired and/or wireless network, for
example, or any combination thereof. It is noted that the
terms, server, server device, server computing device, server
computing platform and/or similar terms are used inter-
changeably.

It should be understood that for ease of description, a
network device (also referred to as a networking device)
may be embodied and/or described in terms of a computing
device and vice-versa. However, it should further be under-
stood that this description should in no way be construed so
that claimed subject matter is limited to one embodiment,
such as only a computing device and/or only a network
device, but, instead, may be embodied as a variety of devices
or combinations thereof, including, for example, one or
more illustrative examples.

In the context of the present patent application, the term
sub-network and/or similar terms, if used, for example, with
respect to a network, refers to the network and/or a part
thereof. Sub-networks may also comprise links, such as
physical links, connecting and/or coupling nodes, so as to be
capable to communicate signal packets and/or frames
between devices of particular nodes, including via wired
links, wireless links, or combinations thereof. Various types
of devices, such as network devices and/or computing
devices, may be made available so that device interoper-
ability is enabled and/or, in at least some instances, may be
transparent. In the context of the present patent application,
the term "transparent," if used with respect to devices of a
network, refers to devices communicating via the network in
which the devices are able to communicate via one or more
intermediate devices, such as one or more intermediate
nodes, but without the communicating devices necessarily
specifying the one or more intermediate nodes and/or the
one or more intermediate devices of the one or more
intermediate nodes and/or, thus, may include within the
network the devices communicating via the one or more
intermediate nodes and/or the one or more intermediate
devices of the one or more intermediate nodes, but may
engage in signal communications as if such intermediate
nodes and/or intermediate devices are not necessarily
involved. For example, a router may provide a link and/or
connection between otherwise separate and/or independent
LANs.

The term electronic file and/or the term electronic docu-
ment are used throughout this document to refer to a set of
stored memory states and/or a set of physical signals asso-
ciated in a manner so as to thereby, at least logically, form
a file (e.g., electronic) and/or an electronic document. That
is, it is not meant to implicitly reference a particular syntax,
format and/or approach used, for example, with respect to a
set of associated memory states and/or a set of associated
physical signals. If a particular type of file storage format
and/or syntax, for example, is intended, it is referenced
expressly. It is further noted an association of memory states,
for example, may be in a logical sense and not necessarily
in a tangible, physical sense. Thus, although signal and/or state components of a file and/or an electronic document, for
example, are to be associated logically, storage thereof, for
example, may reside in one or more different places in a
tangible, physical memory, in an embodiment.

Also, for one or more embodiments, an electronic docu-
ment and/or electronic file may comprise a number of
components. As previously indicated, in the context of the
present patent application, a component is physical, but is
not necessarily tangible. As an example, components with
reference to an electronic document and/or electronic file, in
one or more embodiments, may comprise text, for example,
in the form of physical signals and/or physical states (e.g.,
capable of being physically displayed). Typically, memory
states, for example, comprise tangible components, whereas
physical signals are not necessarily tangible, although sig-
nals may become (e.g., be made) tangible, such as if
appearing on a tangible display, for example, as is not
uncommon. Also, for one or more embodiments, compo-
nents with reference to an electronic document and/or elec-
tronic file may comprise a graphical object, such as, for
example, an image, such as a digital image, and/or sub-
objects, including attributes thereof, which, again, comprise
physical signals and/or physical states (e.g., capable of being
tangibly displayed). In an embodiment, digital content may
comprise, for example, text, images, audio, video, and/or
other types of electronic documents and/or electronic files,
including portions thereof, for example.

For one or more embodiments, a device, such as a
computing device and/or networking device, may comprise,
for example, any of a wide range of digital electronic
devices, including, but not limited to, desktop and/or note-
book computers, high-definition televisions, digital versatile
disc (DVD) and/or other optical disc players and/or record-
ers, game consoles, satellite television receivers, cellular
telephones, tablet devices, wearable devices, personal digital
assistants, mobile audio and/or video playback and/or
recording devices, Internet of Things (IoT) type devices, or
any combination of the foregoing. Further, unless specifi-
cally stated otherwise, a process as described, such as with
reference to flow diagrams and/or otherwise, may also be
executed and/or affected, in whole or in part, by a computing
device and/or a network device. A device, such as a com-
puting device and/or network device, may vary in terms of
capabilities and/or features. Claimed subject matter is
intended to cover a wide range of potential variations. For
example, a device may include a numeric keypad and/or
other display of limited functionality, such as a monochrome
liquid crystal display (LCD) for displaying text, for
example. In contrast, however, as another example, a web-
enabled device may include a physical and/or a virtual
keyboard, mass storage, one or more accelerometers, one or
more gyroscopes, global positioning system (GPS) and/or
other location-identifying type capability, and/or a display
with a higher degree of functionality, such as a touch-
sensitive color 2D or 3D display, for example.

As suggested previously, communications between a
computing device and/or a network device and a wireless
network may be in accordance with known and/or to be
developed network protocols including, for example, global
system for mobile communications (GSM), enhanced data
rate for GSM evolution (EDGE), 802.11b/g/n/h, etc., and/or
worldwide interoperability for microwave access
(WiMAX). As suggested previously, a computing device
and/or a networking device may also have a subscriber
identity module (SIM) card, which, for example, may com-
prise a detachable or embedded smart card that is able to
store subscription content of a subscriber, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communications device application enabling and/or facilitating communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   receiving, at one or more control/management computing devices of an online content delivery environment via an electronic communications network, a first request from a first participant computing platform to access the online content delivery environment;
   initiating, at least in part via the one or more control/management computing devices, entry of the first participant computing platform into the online content delivery environment;
   initiating, at least in part via the one or more control/management computing devices, transmission of a first single-use token to the first participant computing platform via the electronic communications network, wherein the first single-use token is to permit the first participant computing platform to upload digital content comprising signals and/or states acquired from one or more imaging devices and/or one or more audio input devices of the first participant computing platform to the online content delivery environment via the electronic communications network; and
   obtaining, at the one or more control/management computing devices, the digital content from the first participant computing platform via the electronic communications network;
   wherein the initiating entry of the first participant computing platform into the online content delivery environment comprises:
   receiving, via the electronic communications network, a second request from the first participant computing platform to join a first virtual group;
   determining that the first participant computing platform is authorized to join the first virtual group;
   transmitting, from the one or more control/management computing devices, a second single-use token to the first participant computing platform via the electronic communications network; and
   streaming audio and/or digital content generated at least in part by one or more second participant computing platforms of the first virtual group to the first participant computing platform via the electronic communications network at least in part in accordance with a subscription indicated at least in part via the second single-use token.

2. The method of claim 1, wherein the first single-use token further identifies a first control/management computing device of the one or more control/management computing devices.

3. The method of claim 2, wherein the obtaining the digital content from the first participant computing platform comprises obtaining the digital content from the first participant computing platform at the first control/management computing device via the electronic communications network in accordance with the first single-use token.

4. The method of claim 1, wherein the initiating entry of the first participant computing platform into the online content delivery environment comprises authenticating the first participant computing platform at least in part by:
   transmitting, via the electronic communications network, a digitally signed authentication request identifying, at least in part, the first participant computing platform to an authentication provider; and
   obtaining authentication results from the authentication provider via the electronic communications network.

5. The method of claim 4, wherein the authenticating the first participant computing platform further comprises checking a role specified via the first request and initiating entry of the first participant computing platform into the online content delivery environment responsive at least in part to the requested role matching a role authorized by the one or more control/management computing devices.

6. The method of claim 1, wherein the initiating entry of the first participant computing platform into the online content delivery environment comprises:
   transmitting, via the electronic communications network, one or more parameters identifying a first virtual group within the online content delivery environment to the first participant computing platform; and

allowing the first participant computing platform to join the identified first virtual group.

7. The method of claim 1, further comprising the one or more control/management computing devices allocating memory and/or other computing resources to provide a notebook and/or scratchpad for use by the first participant computing platform.

8. An apparatus, comprising: a control/management computing device of an online content delivery environment, wherein the control/management computing device comprises at least one processor and at least one memory coupled to the processor, and wherein the control/management computing device is to:

receive, via an electronic communications network, a first request from a first participant computing platform to access the online content delivery environment;

initiate, at least in part via the control/management computing device, entry of the first participant computing platform into the online content delivery environment;

initiate, at least in part via the control/management computing device, transmission, via the electronic communications network, of a first single-use token to the first participant computing platform, wherein the first single-use token to permit the first participant computing platform to upload digital content comprising signals and/or states acquired from one or more imaging devices and/or one or more audio input devices of the first participant computing platform to the online content delivery environment via the electronic communications network; and obtain, at the control/management computing device, the digital content from the first participant computing platform via the electronic communications network;

wherein, to initiate the entry of the first participant computing platform into the online content delivery environment, the control/management computing device to:

receive, via the electronic communications network, a second request from the first participant computing platform to join a first virtual group;

determine that the first participant computing platform is authorized to join the first virtual group;

initiate transmission of a second single-use token from the control/management computing device to the first participant computing platform via the electronic communications network; and stream, via the electronic communications network, audio and/or digital content generated at least in part by one or more second participant computing platforms of the first virtual group to the first participant computing platform at least in part in accordance with a subscription indicated at least in part via the second single-use token.

9. The apparatus of claim 8, wherein the first single-use token further identifies the control/management computing device.

10. The apparatus of claim 9, wherein, to obtain the digital content from the first participant computing platform, the control/management computing device to obtain, via the electronic communications network, the digital content from the first participant computing platform in accordance with the first single-use token.

11. The apparatus of claim 8, wherein, to initiate the entry of the first participant computing platform into the online content delivery environment, the control/management computing device to authenticate the first participant computing platform, wherein the control/management computing device to:

initiate transmission, via the electronic communications network, of a digitally signed authentication request identifying, at least in part, the first participant computing platform to an authentication provider; and obtain authentication results from the authentication provider via the electronic communications network.

12. The apparatus of claim 11, wherein, to authenticate the first participant computing platform, the control/management computing device further to:

check a role specified via the first request; and initiate entry of the first participant computing platform into the online content delivery environment responsive at least in part to the requested role matching a role authorized by the control/management computing device.

13. The apparatus of claim 8, wherein, to initiate the entry of the first participant computing platform into the online content delivery environment, the control/management computing device to:

initiate transmission, via the electronic communications network, of one or more parameters identifying a first virtual group within the online content delivery environment to the first participant computing platform; and allow the first participant computing platform to join the identified first virtual group.

14. The apparatus of claim 8, wherein the control/management computing device further to allocate memory and/or other computing resources to provide a notebook and/or scratchpad for use by the first participant computing platform.

15. An article, comprising: a non-transitory computer readable medium having stored thereon instructions executable by one or more control/management computing devices of an online content delivery environment to:

receive, via an electronic communications network, a first request from a first participant computing platform to access the online content delivery environment;

initiate, at least in part via the one or more control/management computing devices, entry of the first participant computing platform into the online content delivery environment;

initiate, at least in part via the one or more control/management computing devices, transmission, via the electronic communications network, of a first single-use token to the first participant computing platform, wherein the first single-use token to permit the first participant computing platform to upload digital content comprising signals and/or states acquired from one or more imaging devices and/or one or more audio input devices of the first participant computing platform to the online content delivery environment via the electronic communications network; and obtain, at the one or more control/management computing devices, the digital content from the first participant computing platform via the electronic communications network;

wherein, to initiate the entry of the first participant computing platform into the online content delivery environment, the one or more control/management computing devices to:

receive, via the electronic communications network, a second request from the first participant computing platform to join a first virtual group;

determine that the first participant computing platform is authorized to join the first virtual group;

initiate transmission of a second single-use token from the one or more control/management computing devices to the first participant computing platform via the electronic communications network;

stream, via the electronic communications network, audio and/or digital content generated at least in part by one or more second participant computing platforms of the first virtual group to the first participant computing platform at least in part in accordance with a subscription indicated at least in part via the second single-use token.

16. The article of claim 15, wherein the first single-use token further identifies a first control/management computing device of the one or more control/management computing devices wherein, to obtain the digital content from the first participant computing platform, the first control/management computing device to obtain, via the electronic communications network, the digital content from the first participant computing platform in accordance with the first single-use token.

17. The article of claim 15, wherein, to initiate the entry of the first participant computing platform into the online content delivery environment, the one or more control/management computing devices to authenticate the first participant computing platform, wherein the one or more control/management computing devices to:

initiate transmission, via the electronic communications network, of a digitally signed authentication request identifying, at least in part, the first participant computing platform to an authentication provider;

obtain authentication results from the authentication provider via the electronic communications network;

check a role specified via the first request; and initiate entry of the first participant computing platform into the online content delivery environment responsive at least in part to the requested role matching a role authorized by the one or more control/management computing devices.

* * * * *